(12) United States Patent
Vaughn et al.

(10) Patent No.: US 11,286,037 B2
(45) Date of Patent: Mar. 29, 2022

(54) DUCTED ROTOR BLADE TIP EXTENSION

(71) Applicant: Bell Helicopter Textron Inc., Fort Worth, TX (US)

(72) Inventors: Robert Glenn Vaughn, Keller, TX (US); Michael J. Ryan, Colleyville, TX (US); Brent Randal Achttien, Watauga, TX (US); Kirk L. Groninga, Keller, TX (US); Daniel B. Robertson, Southlake, TX (US); Matthew Edward Louis, Fort Worth, TX (US)

(73) Assignee: Textron Innovations Inc., Fort Worth, TX (US)

( * ) Notice: Subject to any disclaimer, the term of this patent is extended or adjusted under 35 U.S.C. 154(b) by 752 days.

(21) Appl. No.: 16/159,208

(22) Filed: Oct. 12, 2018

(65) Prior Publication Data
US 2020/0115036 A1    Apr. 16, 2020

(51) Int. Cl.
| | |
|---|---|
| *B64C 11/00* | (2006.01) |
| *B64C 11/18* | (2006.01) |
| *B29C 39/10* | (2006.01) |
| *B64C 29/00* | (2006.01) |
| *F16J 15/3288* | (2016.01) |
| *B29L 31/08* | (2006.01) |

(52) U.S. Cl.
CPC .......... *B64C 11/001* (2013.01); *B29C 39/10* (2013.01); *B64C 11/18* (2013.01); *B64C 29/0033* (2013.01); *B29L 2031/087* (2013.01); *F16J 15/3288* (2013.01)

(58) Field of Classification Search
CPC ..... B64C 11/001; B64C 11/18; B64C 23/069; B64C 27/20; B64C 27/463; B64C 2201/162; B64C 2230/28; F04D 29/325; F04D 29/38; F04D 29/382
See application file for complete search history.

(56) References Cited

U.S. PATENT DOCUMENTS

| | | |
|---|---|---|
| 3,117,716 A | 1/1964 | Wernicke |
| 3,127,093 A | 3/1964 | Sudrow |
| (Continued) | | |

FOREIGN PATENT DOCUMENTS

| | | |
|---|---|---|
| EP | 2112330 A2 | 10/2009 |
| EP | 2607628 A2 | 6/2013 |
| (Continued) | | |

OTHER PUBLICATIONS

EPO Examination Report issued in EP Patent Application No. 19156604.1 dated Aug. 20, 2020, 4 pages.
(Continued)

*Primary Examiner* — Philip J Bonzell
*Assistant Examiner* — Michael B. Kreiner
(74) *Attorney, Agent, or Firm* — Patent Capital Group

(57) ABSTRACT

A rotor system is provided in one example embodiment and may include a rotor duct; at least one rotor blade, wherein the at least one rotor blade comprises a tip end; and a tip extension affixed at the tip end of the at least one rotor blade, wherein the tip extension comprises a plurality of flexible elements and the rotor blade has a fixed extended length based on the tip extension. The tip extension may provide a clearance distance between the tip extension and the rotor duct.

15 Claims, 28 Drawing Sheets

(56) References Cited

U.S. PATENT DOCUMENTS

| | | | |
|---|---|---|---|
| 3,680,977 A * | 8/1972 | Rabouyt | B64C 11/001 |
| | | | 415/173.6 |
| 4,531,362 A | 7/1985 | Barry et al. | |
| 5,462,408 A | 10/1995 | Coffy | |
| 5,752,802 A | 5/1998 | Jones | |
| 6,206,642 B1 | 3/2001 | Matheny et al. | |
| 6,464,166 B1 * | 10/2002 | Yoeli | B64C 27/20 |
| | | | 244/12.1 |
| 6,561,456 B1 | 5/2003 | Devine | |
| 7,549,841 B1 * | 6/2009 | Marussich | F01D 11/12 |
| | | | 415/173.3 |
| 7,850,116 B2 * | 12/2010 | Stuhr | B64D 27/12 |
| | | | 244/54 |
| 8,777,572 B2 | 7/2014 | Cheong et al. | |
| 8,899,938 B2 * | 12/2014 | Enthammer | B64C 27/463 |
| | | | 416/236 R |
| 2007/0231128 A1 * | 10/2007 | Callas | F04D 29/164 |
| | | | 415/173.3 |
| 2011/0164962 A1 * | 7/2011 | Wilson, Jr. | F01D 11/08 |
| | | | 415/173.3 |
| 2012/0195767 A1 | 8/2012 | Gervais et al. | |
| 2014/0064937 A1 * | 3/2014 | Kray | F16J 15/3288 |
| | | | 415/173.2 |
| 2014/0255201 A1 * | 9/2014 | Sutton | B64C 27/463 |
| | | | 416/241 R |
| 2016/0177745 A1 | 6/2016 | Uskert et al. | |
| 2016/0207623 A1 | 7/2016 | Carson | |

FOREIGN PATENT DOCUMENTS

| | | |
|---|---|---|
| JP | 2001097288 A | 4/2001 |
| WO | 199001002 | 2/1990 |
| WO | 2014003968 A1 | 1/2014 |
| WO | 2014096839 A1 | 6/2014 |

OTHER PUBLICATIONS

J-Platpat, Patent & Utility Model Number Search, JP 2001-097288A Drawings, retrieved and printed Aug. 8, 2018, 12 pages.

EPO Examination Report issued in EP Patent Application No. 19156604.1 dated Mar. 16, 2020, 4 pages.

EPO Examination Report issued in EP Patent Application No. 19156604.1 dated Jan. 18, 2021, 5 pages.

EPO Examination Report issued in EP Patent Application No. 19156604.1 dated Jan. 3, 2020, 4 pages.

EPO Examination Report issued in EP Patent Application No. 19156604.1 dated Aug. 13, 2019, 5 pages.

EPO Search Report issued in EP Patent Application No. 19156604.1 dated Jul. 17, 2019, 4 pages.

USPTO Non-Final Office Action for U.S. Appl. No. 16/159,178 dated Mar. 18, 2021.

* cited by examiner

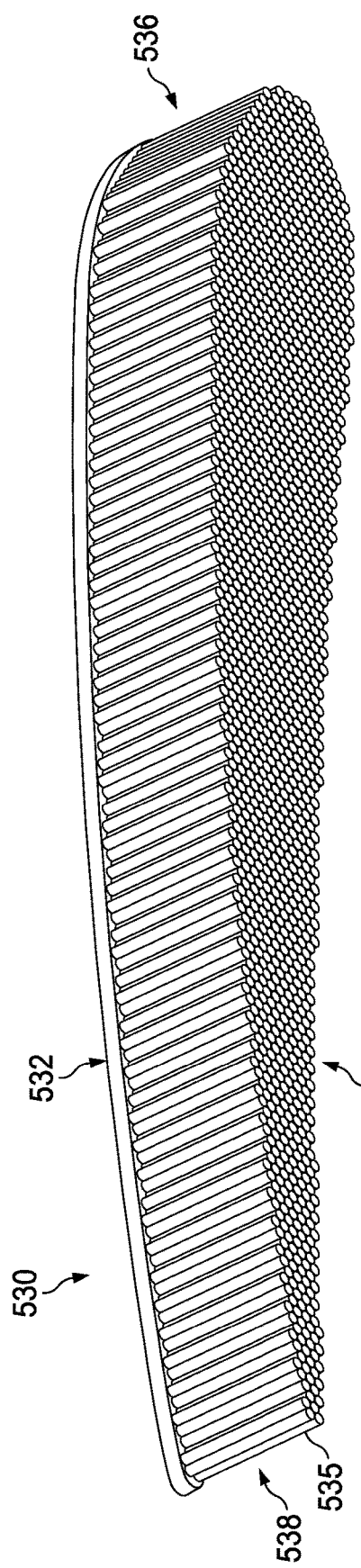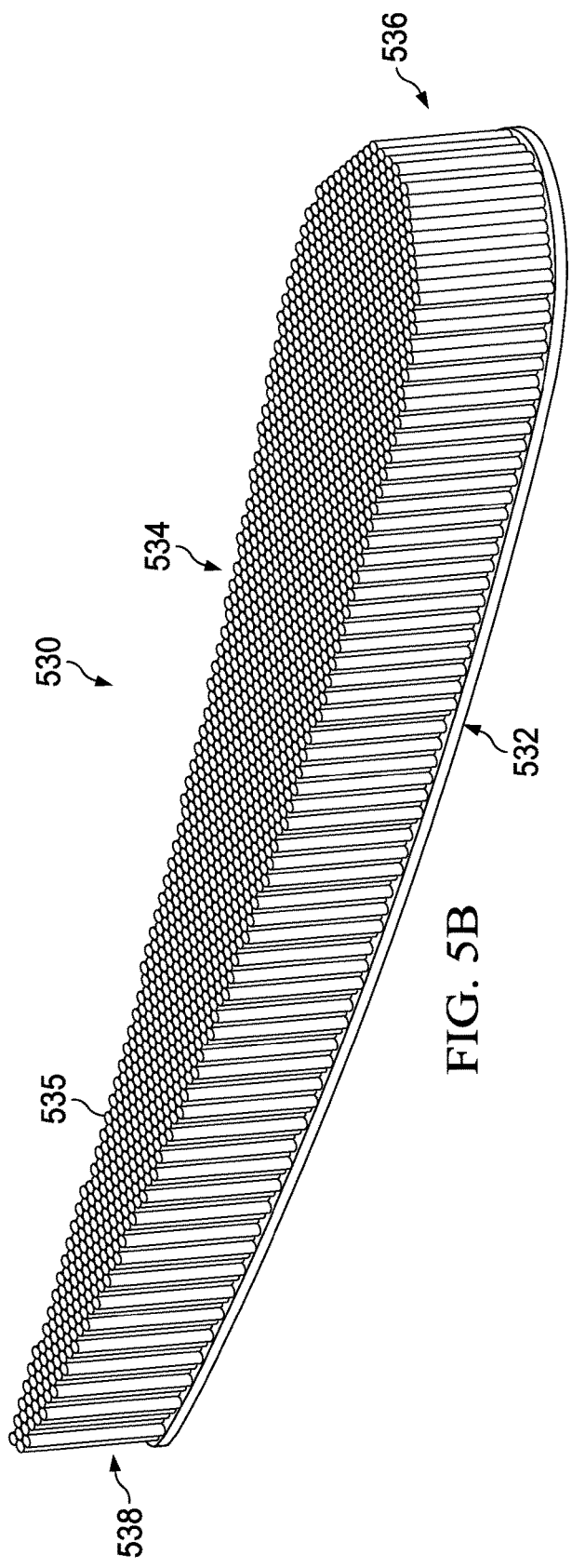
FIG. 5A
FIG. 5B

DUCTED ROTOR BLADE TIP EXTENSION

TECHNICAL FIELD

This disclosure relates in general to the field of aircraft and, more particularly, though not exclusively, to rotor blade tip extensions for ducted rotor systems.

BACKGROUND

There are numerous considerations involved in the design of aircraft, such as rotorcraft, including size, weight, power efficiency, fuel efficiency, noise, vibration, structural loads, and so forth. In many cases, however, it may be challenging to improve certain aspects of an aircraft without disrupting other aspects. For example, rotor blade design for aircraft rotor systems, such as ducted rotor systems, can implicate numerous performance considerations and is often an extremely challenging aspect of aircraft design.

SUMMARY

According to one aspect of the present disclosure, a rotor system may be provided and may include a rotor duct; at least one rotor blade, wherein the at least one rotor blade comprises a tip end; and a tip extension affixed at the tip end of the at least one rotor blade, wherein the tip extension comprises a plurality of flexible elements and the rotor blade has a fixed extended length based on the tip extension. The tip extension may provide a clearance distance between the tip extension and the rotor duct. The tip extension may have a shape that matches a shape of the at least one rotor blade.

In some cases, the flexible elements may be flexible bristles that are fused together along an inboard end of the tip extension. In still some cases, the flexible elements may be flexible bristles that are banded together along an inboard end of the tip extension. The flexible bristles can be banded together using a sealant. In some cases, the tip extension can be affixed to the tip end of the rotor blade with an adhesive.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

FIGS. 5A-5C are simplified diagrams illustrating example details that may be associated with another tip extension for another ducted rotor blade, in accordance with certain embodiments.

DETAILED DESCRIPTION

Figure 1:
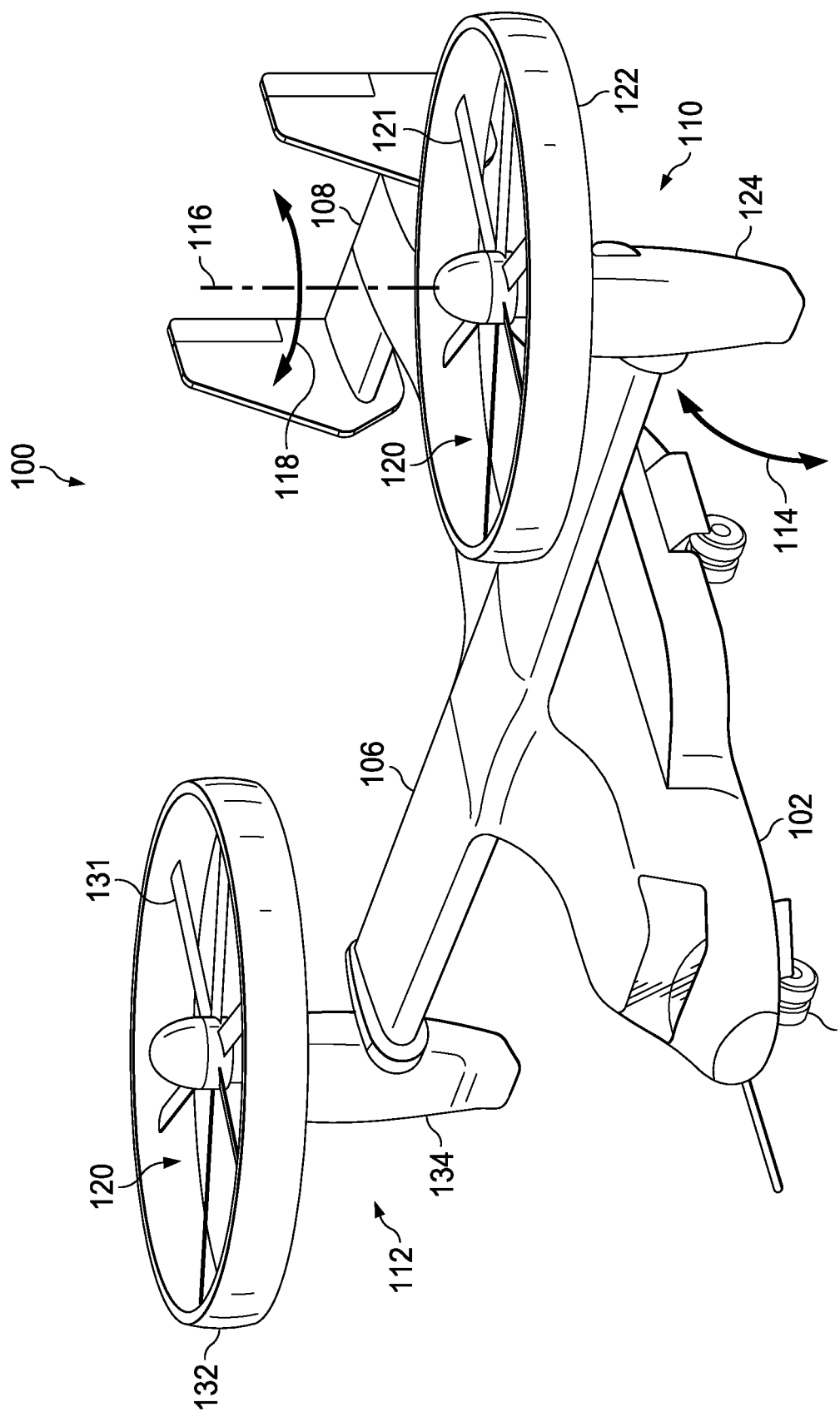
FIG. 1 is a simplified diagram of an example aircraft, in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as 'above', 'below', 'upper', 'lower', 'top', 'bottom', or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase 'between X and Y' represents a range that includes X and Y.

Additionally, as referred to herein in this Specification, the terms 'forward', 'aft', 'inboard', and 'outboard' may be used to describe relative relationship(s) between components and/or spatial orientation of aspect(s) of a component or components. The term 'forward' may refer to a spatial direction that is closer to a front of an aircraft relative to another component or component aspect(s). The term 'aft' may refer to a spatial direction that is closer to a rear of an aircraft relative to another component or component aspect(s). The term 'inboard' may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term 'outboard' may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Referring to FIG. 1, FIG. 1 illustrates an example embodiment of an example aircraft, which, in this example is a vertical take-off and landing (VTOL) aircraft 100, in accordance with certain embodiments. FIG. 1 portrays a perspective view of VTOL aircraft 100. In at least one embodiment, VTOL aircraft 100 may include a fuselage 102, a landing gear 104, a wing 106, a tail member 108, a ducted rotor system 110, and a ducted rotor system 112. The fuselage 102 is the main body of VTOL aircraft 100, which may include a cabin (e.g., for crew, passengers, and/or cargo) and/or may house certain mechanical and electrical components for VTOL aircraft 100. In the illustrated embodiment, tail member 108 may be used as a vertical and a horizontal stabilizer.

Ducted rotor system 110 includes a proprotor 120, a rotor duct 122, and a nacelle 124. Proprotor 120 includes a plurality of rotor blades 121. Ducted rotor system 112 includes a proprotor 130, a rotor duct 132, and a nacelle 134. Proprotor 130 includes a plurality of rotor blades 131. The position of proprotors 120 and 130, as well as the pitch of rotor blades 121 and 131, can be selectively controlled in order to provide flight capabilities (e.g., flight direction, thrust, and/or lift) for VTOL aircraft 100.

The position of proprotors 120 and 130 are moveable (as generally indicated by arrows 114) between a helicopter mode position and an airplane mode position to provide different types of thrust for tiltrotor aircraft 100. FIG. 1 illustrates tiltrotor aircraft 100 proprotors 120 and 130 in a helicopter mode position in which proprotors 120 and 130 are positioned substantially vertical to provide a lifting thrust. For an airplane mode position, proprotors 120 and 130 can be positioned substantially horizontal to provide a forward thrust in which a lifting force is supplied by wing 106. It should be appreciated that tiltrotor aircraft can be operated such that proprotors 120 and 130 can be selectively positioned between airplane mode and helicopter mode positions, which can be referred to as a 'conversion mode', 'conversion mode positioning', or variations thereof.

Ducted rotor systems 110 and 112 are illustrated in the context of VTOL aircraft 100; however, ducted rotor systems 110 and 112 can be implemented on other VTOL aircraft. For example, an alternative embodiment may include a multi-ducted rotor system VTOL aircraft that has an additional wing member aft of wing 106 and the additional wing member may have additional ducted rotor systems similar to ducted rotor systems 110 and 112. In another embodiment, ducted rotor systems 110 and 112 can be used with an unmanned version of VTOL aircraft 100. Further, ducted rotor systems 110 and 112 can be integrated into a variety of aircraft configurations. In still some embodiments, a ducted rotor system may be provided for a tail member of an aircraft. One example of a ducted rotor system that may be provided for an aircraft tail member may be a Fenestron in which a duct and rotor blades are provided within the tail member.

Various engine(s), gearbox(es), and drive shaft(s) may be provided in various configurations to provide torque to proprotors 120 and 130 (e.g., via nacelles 124 and 134). Respective rotor ducts 122 and 132 can be structurally secured to respective nacelles 124 and 134 using any suitable techniques. Rotor ducts 122 and 132 may extend vertically beyond top sides and bottom sides of rotor blades 121 and 131.

In various embodiments, the pitch of rotor blades 121 and 131 can be managed and/or adjusted using collective control and/or cyclic control to selectively control direction, thrust, and/or lift of VTOL aircraft 100. During collective control, all of the rotor blades are collectively pitched together (e.g., the pitch angle is the same for all blades). During cyclic control, the pitch angle of each of the rotor blades varies depending on where each blade is within a cycle of rotation (e.g., at some points in the rotation of rotor blades about the rotational axis of the rotor mast the pitch angle is not the same for all blades), which can effect direction of travel. A rotational axis (generally indicated by dashed lines 116) of the rotor mast associated with proprotor 120 is illustrated in the embodiment of FIG. 1 in which rotor blades 121 can be rotated (as generally indicated by arrows 118) about the rotational axis 116 during operation of ducted rotor system 110. Ducted rotor system 112 may be operated in a similar manner as ducted rotor system 110.

In general, a ducted rotor system can provide improved thrust at reduced power in comparison to non-ducted rotor systems. For example, the power needed to rotate ducted rotor blades to achieve a certain thrust may be reduced for ducted rotor systems in comparison to non-ducted rotor systems. In a ducted rotor system, the tip end of rotor blades is configured to be in close proximity to the inner face of the rotor duct. A small gap or clearance distance is typically configured between the tip end of the rotor blades and the inner face of a rotor duct. Benefits of ducted rotor systems can be realized (e.g., power reduction realized to achieve a given thrust) based on the ratio between the clearance distance and the chord length of the rotor blades. Stated differently, for a constant power input to a ducted rotor system (from an engine), thrust can be increased as the clearance distance to chord length ratio is decreased.

In order for a ducted rotor system to be effective (e.g., to realize its benefits), it is desirable to tightly control tip clearance distance between the rotor blades and the rotor duct inner face. Due to manufacturing and/or assembly tolerances as well as operational and/or aerodynamic loads and/or forces that an aircraft may be subjected to during operation (e.g., lift, drag, centrifugal forces, aerodynamic shears, and so forth) it can be difficult to maintain a constant tight clearance distance between rotating ducted rotor blades and a fixed rotor duct.

The present disclosure describes various embodiments for providing rotor blade tip extensions that may be composed, at least in part, of a flexible material. The blade tip extensions can include an inboard end and an outboard end in which the inboard end can be affixed at the tip (outboard) end of rotor blades of a ducted rotor system to provide a fixed extended length for the rotor blades. The tip extensions may have the same overall shape or contour as the rotor blades to which they are affixed thereby providing for the ability to extend the overall length of the rotor blades such that the clearance distance between the rotor blades and the inner face of the rotor duct may be minimized for a particular implementation and/or application. Tip extensions may include flexible elements provided along the outboard end. The flexible elements may increase flexibility of tip extensions to provide relief in the direction of motion of rotor blades for any unintended contact that may occur between the tip extensions and the inner face of the rotor duct during operation. Different configurations may be provided for flexible elements of tip extensions in accordance with various embodiments, as discussed in further detail herein.

Example embodiments associated with providing flexible tip extensions for ducted rotor blades are described below with more particular reference to the remaining FIGURES. It should be appreciated that example VTOL aircraft 100 of FIG. 1 is merely illustrative of a variety of aircraft in which a ducted rotor blade tip extensions may be used in accordance with embodiments of the present disclosure. Other aircraft in which ducted rotor blade tip extensions may be used can include, for example, fixed wing airplanes, hybrid aircraft, unmanned aircraft, a variety of helicopter configurations, and drones, among other examples.

Figure 2A:
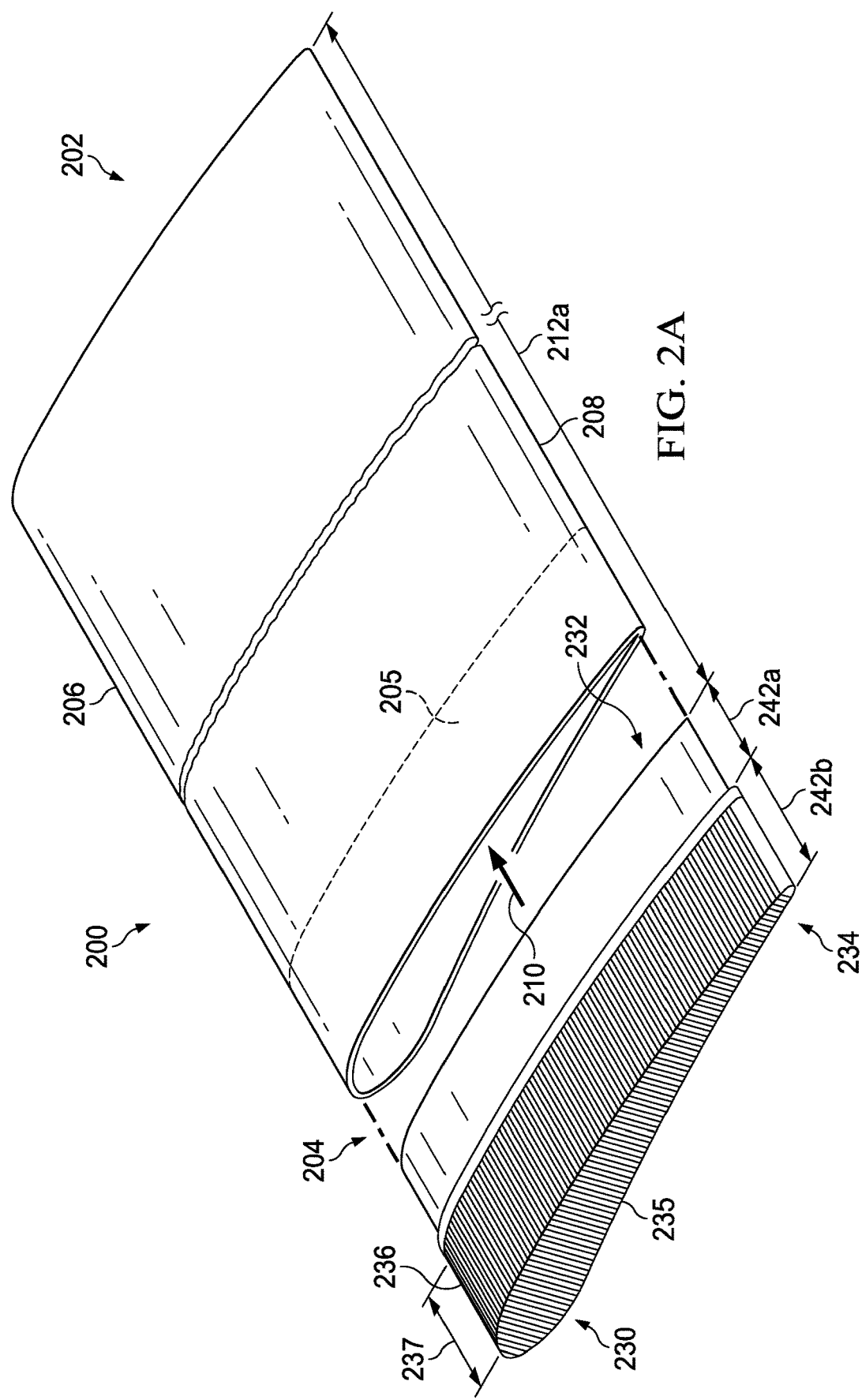
FIGS. 2A-2D are simplified diagrams illustrating example details that may be associated with a tip extension for a ducted rotor blade, in accordance with certain embodiments.
Figure 2B:
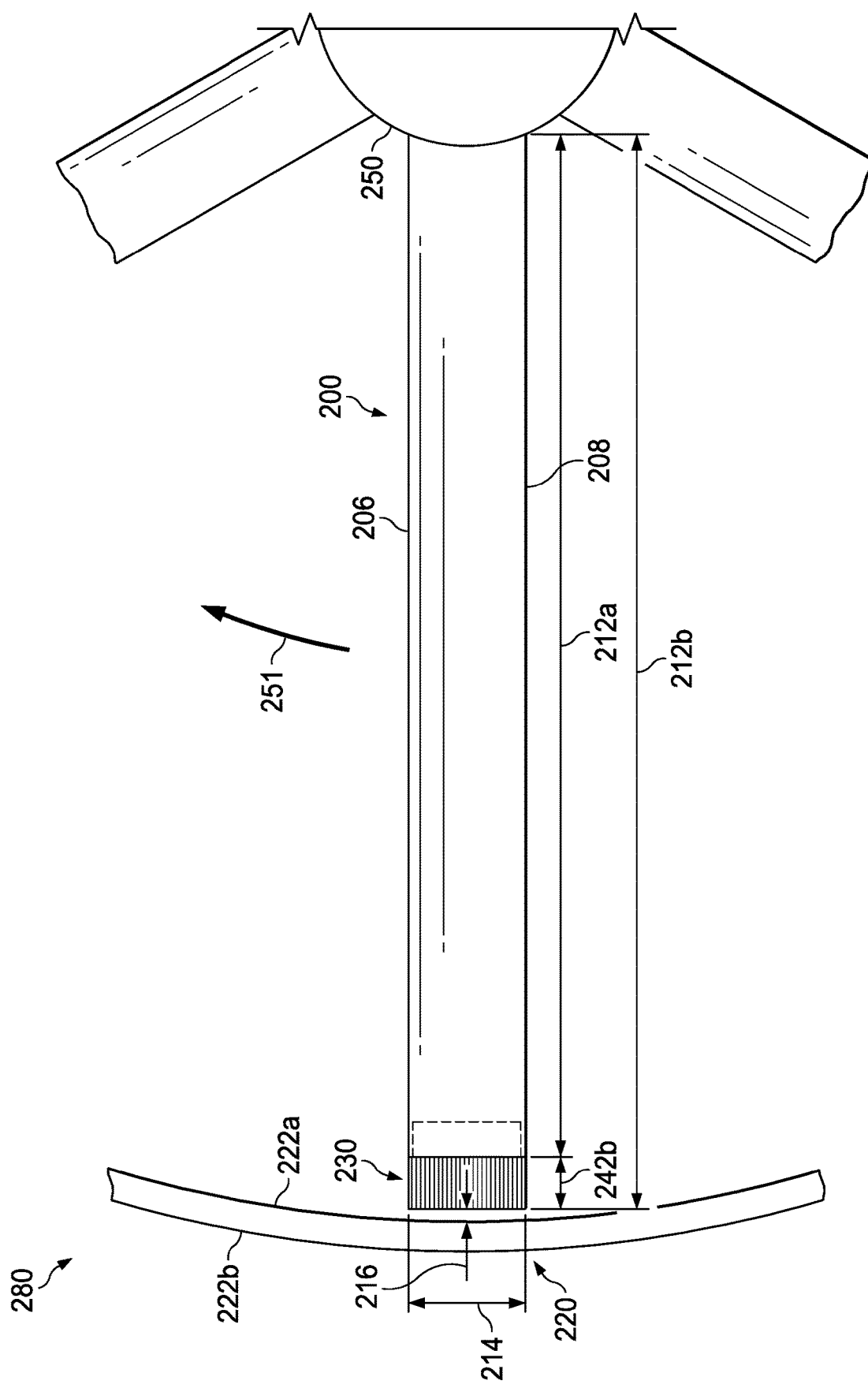
Figure 2C:
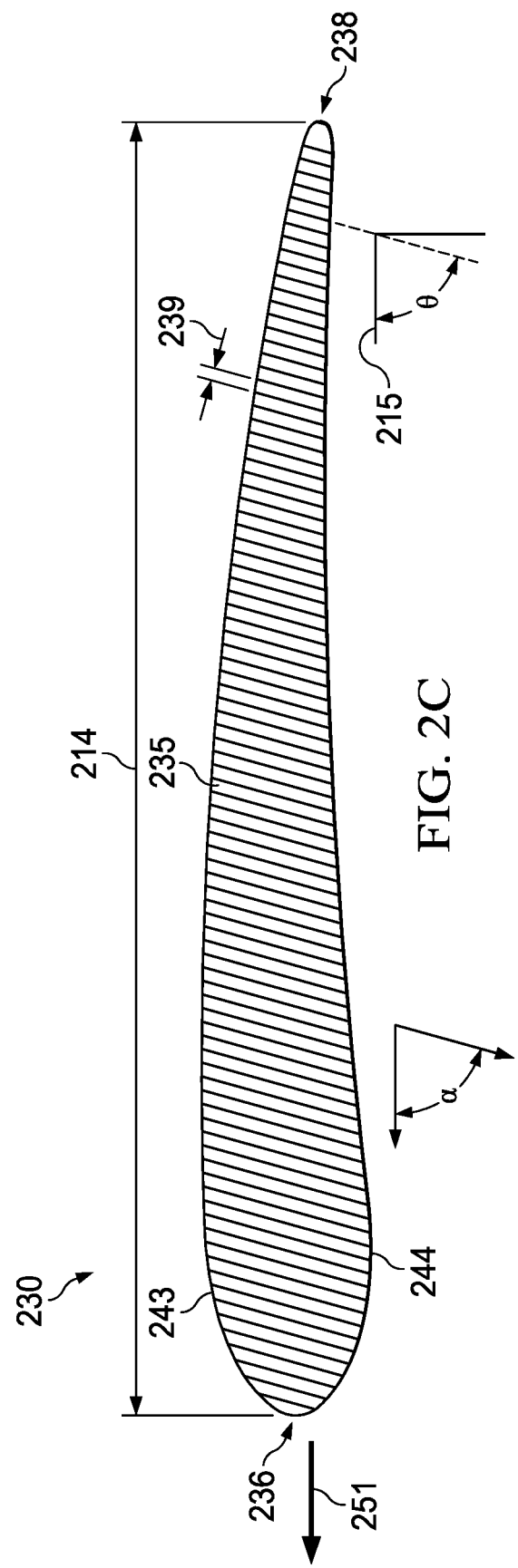
Figure 2D:
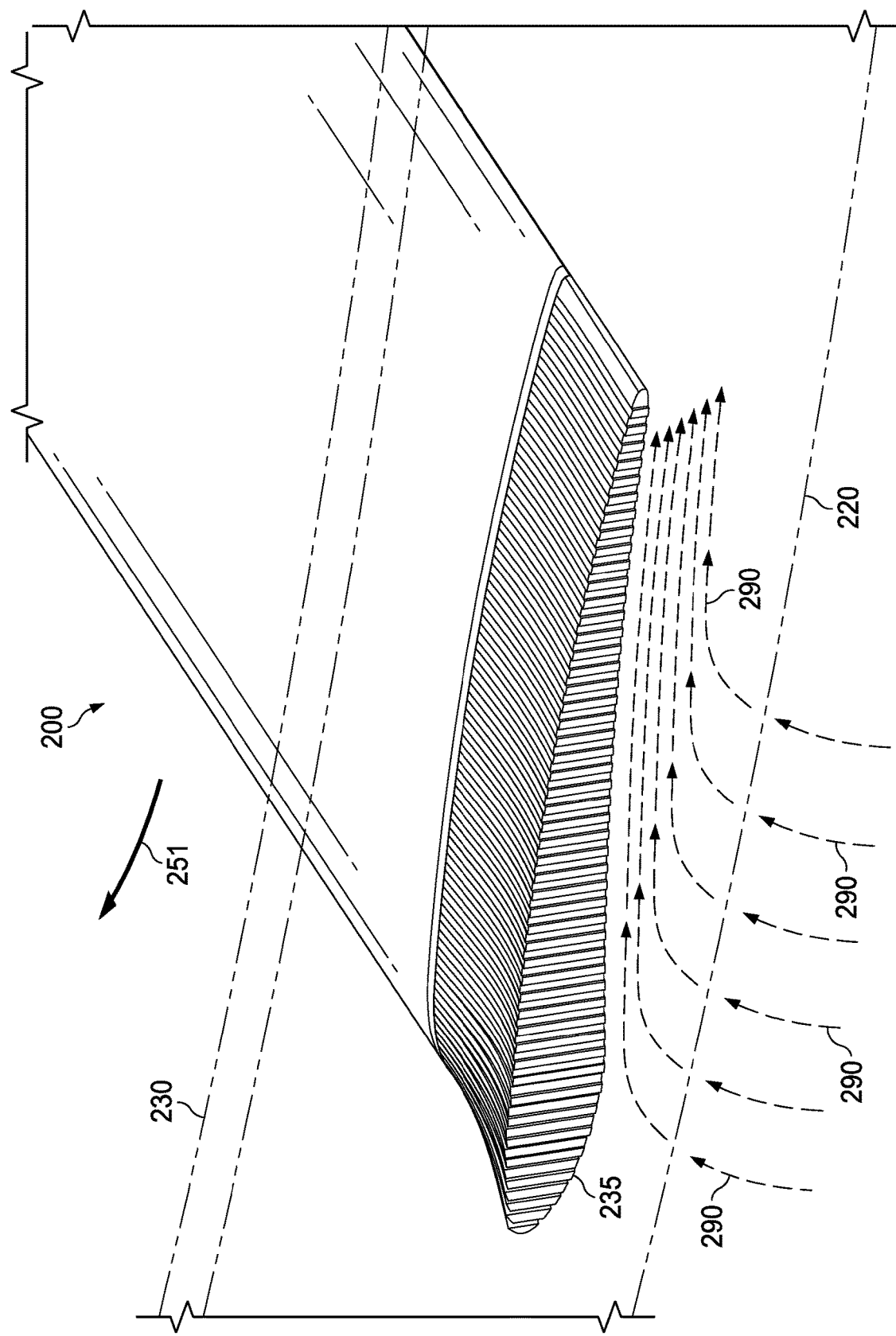

FIGS. 2A-2D are simplified diagrams illustrating example details that may be associated with a tip extension 230 for a ducted rotor blade 200, in accordance with certain embodiments. In particular, FIG. 2A is a simplified perspective view diagram illustrating example details that may be associated with tip extension 230 and ducted rotor blade 200, in accordance with certain embodiments. FIG. 2B is a simplified top view diagram illustrating example details that may be associated with a ducted rotor system 280 in which ducted rotor blade 200 including tip extension 230 may be utilized, in accordance with certain embodiments. FIG. 2C is a simplified side view diagram illustrating other example details that may be associated with tip extension 230, in accordance with certain embodiments. FIG. 2D is a simplified top view diagram illustrating example details that may be associated with an example use case scenario that may occur during operation of ducted rotor blade 200, in accordance with certain embodiments. Discussions associated with tip extension 230, ducted rotor blade 200, and/or rotor duct 220 may make simultaneous reference to FIGS. 2A-2D.

As illustrated in the embodiment of FIG. 2A, ducted rotor blade 200 may include an inboard end 202 (sometimes referred to as the root or root end), an outboard end 204 (also referred to interchangeably herein as 'tip end' 204), a leading edge 206, and a trailing edge 208. Although not illustrated for the embodiment of FIG. 2A, it is to be understood that inboard end 202 may include attachment features for attaching ducted rotor blade 200 to a rotor hub for a given ducted rotor system (e.g., rotor hub 250 for ducted rotor system 280 illustrated in FIG. 2B). Tip extension 230 may include an inboard end 232, an outboard end 234, a leading edge 236, and a trailing edge 238. A plurality of flexible elements 235 may be provided for outboard end 234 of tip extension 230. Rotor blade 200 may have a fixed non-extended length 212a as measured between the inboard end 202 and the tip end 204. Rotor blade 200 may have a chord length 214 (FIG. 2B).

A tip extension may be affixed to a rotor blade tip end using any suitable technique in order to provide a fixed attachment between the tip extension and the tip end of the rotor blade such that a fixed extended length may be provided for the ducted rotor blade when the tip extension is affixed thereto. For example, in at least one embodiment, tip end 204 of ducted rotor blade 200 may include a hollow cavity 205 in which the inboard end 232 of tip extension 230 may be inserted (generally illustrated by arrow 210) to mechanically affix tip extension 230 to ducted rotor blade 200, as illustrated at least in FIG. 2B. In at least one embodiment, inboard end 232 of tip extension 230 may be suitably sized to provide a friction fit mechanical attachment between the inboard end 232 of tip extension 230 and tip end 204 of ducted rotor blade 200. In some embodiments, an adhesive (e.g., silicone, epoxy, or other adhesive) may be used to facilitate mechanical attachment between tip extension 230 and the tip end 204 of ducted rotor blade 200 in addition to or in lieu of a friction fit mechanical attachment between the components.

Other techniques may be used to provide mechanical attachment between a tip extension and a given rotor blade. For example, in some embodiments, the tip end of a rotor blade may be suitably sized to be inserted into a hollow inboard end of a tip extension in order to mechanically affix the tip extension to the rotor blade. In still some embodiments, one or more attachment element(s) (e.g., stud(s), slot(s), bolt(s), clip(s), etc.) may be provided for a rotor blade tip end and one or more mating attachment element(s) may be provided for a tip extension inboard end in order to mechanically affix the tip extension to the rotor blade.

Tip extension 230 may be made, at least in part, of a flexible material to facilitate the plurality of flexible elements 235 provided along the outboard end 234. In various embodiments, tip extension 230 may be made, at least in part, of an elastomer, such as silicon rubber, nylon, polyester, polypropylene, or any other flexible material, which may accommodate elastic deformation of the flexible elements 235 along the outboard end 234 of tip extension 230. In general, silicon rubber is cheap, easy to manufacture, resistant to many chemicals, can be made to have high temperature resistance, and/or may be resistant to abrasion. Other elastomers having similar properties (e.g., soft, malleable, etc.) may be utilized for manufacturing tip extensions in accordance with embodiments herein.

In some embodiments, a tip extension may be made of a flexible material in its entirety; however, in other embodiments only the outboard end of a tip extension may be made of a flexible material while the inboard end may be made of a non-flexible material. For example, in at least one embodiment, the inboard end of a tip extension may be made of a non-flexible material and may include one or more attachment element(s) that may facilitate affixing the tip extension to the tip end of a ducted rotor blade. In such an embodiment, the flexible material for the outboard end of the tip extension may be affixed to the non-flexible inboard end using adhesives, elevated temperature and/or pressure processes, combinations thereof, or the like. In various embodiments, non-flexible materials that may be used for a tip extension inboard end may include composite materials, reinforced composite materials (e.g., carbon fiber reinforced polymers), fiberglass, reinforced fiberglass, plastics, reinforced plastics, metals, metal alloys, combinations thereof, or the like.

FIG. 2B illustrates a portion of a ducted rotor system 280 in which ducted rotor blade 200 including tip extension 230 may be utilized in at least one embodiment. In particular, FIG. 2B illustrates a portion of a rotor duct 220 relative to ducted rotor blade 200 having tip extension 230 attached thereto. A portion of a rotor hub 250 to which ducted rotor blade 200 may be mechanically attached for ducted rotor system 280 is also illustrated in FIG. 2B. Rotor duct 220 may include an inner face 222a and an outer face 222b. During operation, ducted rotor blade 200 may be rotated (as generally indicated by arrow 251) around an axis of rotation of a rotor mast (not shown) mechanically coupled to rotor hub 250.

Tip extension 230 may include an inboard length 242a and an outboard length 242b. When affixed to the tip end 204 of ducted rotor blade 200, tip extension 230 may extend the overall length of ducted rotor blade 200 such that the ducted rotor blade has a fixed extended length 212b as measured between the outboard end 234 of tip extension 230 and the inboard end 202 of ducted rotor blade 200. It is to be understood that the fixed extended length that may be provided for a ducted rotor blade by a tip extension may depend on techniques, structures, features, etc. of the tip extension and/or the ducted rotor blade that may be used to affix the tip extension to the ducted rotor blade.

The fixed extended length 212b of ducted rotor blade 200 may provide a clearance distance (or gap) 216 between the outboard end 234 of tip extension 230 and inner face 222a of rotor duct 220. Clearance distance 216 may depend on application and/or implementation based on the clearance distance (gap) to chord length ratio designed for the ducted rotor system 280. In some embodiments, clearance distance 216 may be less than one inch. In still some embodiments, clearance distance 216 may be less than 0.5 inches.

In general, an airfoil (sometimes referred to as airfoil shape) is the cross-sectional shape of a wing or rotor blade. The cross-sectional shape of any exposed portion of a tip extension (e.g., outboard end 234 of tip extension 230 not inserted into the tip end 204 of ducted rotor blade 200) may be the same as the cross-sectional shape of the tip end of the ducted rotor blade to which the tip extension is attached. For example, outboard end 234 of tip extension 230 may have an airfoil shape that is the same as the airfoil shape of the tip end 204 of ducted rotor blade 200 such that tip extension 230 may have aerodynamic characteristics (e.g., lift, drag, etc.) that are similar to aerodynamic characteristics of the tip end 204 of ducted rotor blade 200. The cross-sectional (airfoil) shape of tip extension 230 is further illustrated in FIG. 2C.

As illustrated in FIG. 2C, tip extension 230 may have a top surface 243 and a bottom surface 244. Respective top surface 243 and bottom surface 244 of tip extension 230 may be at a same level as the respective top surface and bottom surface (not labeled) of ducted rotor blade 200. In at least one embodiment, flexible elements 235 may be formed for the outboard end 234 of tip extension 230 by providing a plurality of cuts, incisions, or the like at the outboard end 234 that extend linearly from top surface 243 to bottom surface 244 and to a length 237 that extends inward from the outboard end 233 toward the inboard end 232 of the tip extension 230. Flexible elements 235 may be linear between the top surface 243 and the bottom surface 244 of tip extension 230 for the embodiments of FIGS. 2A-2D.

In general, cuts used to form flexible elements 235 may have an orientation such that unintended contacts that may occur between tip extension 230 and rotor duct 220 can be absorbed along the motion of rotation (251) of ducted rotor blade 200. In some embodiments, cuts may be approximately parallel with the rotation axis of a ducted rotor blade; however, in other embodiments, cuts may be provided at a theta (θ) offset angle in order to accommodate different pitch angles of ducted rotor blades, as discussed in further detail below. In still other embodiments, curved cuts may be utilized in order to form flexible elements that are curved between the top surface and the bottom surface of tip extensions. In still some embodiments, any combination of straight and curved cuts may be utilized to form flexible elements for tip extensions.

Length 237 of flexible elements 235 may be less than outboard length 242b of tip extension 230. Flexible elements 235 may have a width 239. In some embodiments, flexible elements 235 may have a uniform width 239 along chord length 214; however, in other embodiments, flexible elements 235 may have varying width 239 along chord length 214.

As noted above, ducted rotor blade 200 may have different alpha (α) pitch angles as it is rotated (251) around the mast axis during operation. In order maintain ducted effectiveness of ducted rotor blade 200 during operation of ducted rotor system 280, it is important to minimize the amount of air that may pass through flexible elements 235 (e.g., from the bottom side of the tip extension up through the flexible elements and out the top side) during instances in which unintended contact(s) may occur between tip extension 230 and rotor duct 220.

In some embodiments, flexible elements 235 may be provided for the outboard end 234 of tip extension 230 at a theta (θ) offset angle relative to a horizontal axis 215 (that is oriented parallel with the chord length 214) such that the θ offset angle may accommodate the potential range of α pitch angles of the ducted rotor blade 200 in order to limit air from passing between the flexible elements 235 for instances in which tip extension 230 may contact the inner face 222a of rotor duct 220 during rotations. For example, for the embodiment of FIGS. 2A-2D, if an unintended contact occurs between tip extension 230 and the inner face 222a during a cycle of rotation as the leading edge 236 of ducted rotor blade 200 is pitched downward, the θ offset angle of flexible elements 235 may limit air from passing through the tip extension 230.

An example use case scenario illustrating features associated with flexible elements 235 is illustrated in FIG. 2D in which the leading edge 236 of ducted rotor blade may be tilted downward at a given α pitch angle during a cycle of rotation (251) and an unintended contact may occur between tip extension 230 and rotor duct 220. As illustrated in the example use case scenario of FIG. 2D, for instances in which an unintended contact may occur between tip extension 230 and rotor duct 220, contact energy may be absorbed by flexible elements 235 causing them to deform. During such contact, air (as generally indicated by dashed-line arrows 290) may be deflected along the bottom side 244 of the tip extension 230 rather than passing through the deformed flexible elements 235; thereby, helping to maintain ducted effectiveness of the ducted rotor system 280 while also limiting contact loads from being transferred into the rotor duct 220 and/or ducted rotor blade 200, which may minimize damage to the rotor duct and/or the ducted rotor blade during such unintended contacts.

In at least one embodiment, the length 237 of cuts that may be used to form flexible elements 235 may be based on the clearance distance 216 that is to be provided for a particular implementation and/or application and/or the amount of expected contact that may need to be absorbed for different operating conditions. For example, a longer length 237 may be utilized if the clearance distance 216 is to be small and/or the contact to be absorbed is expected to be large while a shorter length 237 may be utilized if the clearance distance 216 is to be large and/or the contact to be absorbed is expected to be small.

Although the embodiments of FIGS. 2A-2D illustrate flexible elements 235 that are linear between the top surface 243 and the bottom surface 244 of tip extension 230, flexible elements of tip extensions may have other shapes, in accordance with embodiments of the present disclosure, as discussed below in FIG. 3.

In still some embodiments, flexible elements of a rotor blade tip extension may be a plurality of bristles that may be fused together using heat. In still some embodiments, flexible elements of a rotor blade tip extension may be a plurality of bristles that may be banded together using a sealant, such as Room Temperature Vulcanizing (RTV) sealant, an adhesive, combinations thereof, or the like.

Embodiments described throughout this disclosure that involve providing rotor blade tip extensions made, at least in part, of a flexible material and having flexible elements along the tip extension outboard end may provide numerous technical advantages. For example, because tip extensions may be made, at least in part, using a flexible material, they can be molded into a particular shape and length depending on the rotor system (rotor blade size, shape, length, etc.) in which they may be implemented.

One advantage of embodiments described herein involving flexible rotor blade tip extensions may include potentially providing more relaxed manufacturing, design, and/or assembly tolerances for ducted rotor blade systems, which may decrease manufacturing costs and/or time for ducted rotor systems. As flexible tip extensions may be molded into any shape and/or length, another advantage of embodiments described herein may include providing flexible tip extensions for rotor blades in order to provide a fixed extended length for the rotor blades such that the clearance distance between rotor blades and a rotor duct may be minimized for a particular ducted rotor system, which may increase the ducted effectiveness of the ducted rotor system.

Yet another advantage of embodiments described herein involving flexible rotor blade tip extensions may include providing for the ability to install and/or replace tip extensions that may be worn or damaged rather than replacing an entire blade and/or rotor blade system that may be damaged or worn. For example, it may be easier, less time consuming, and/or less costly to replace a worn or damaged flexible rotor blade tip as opposed to replacing an entire rotor blade and/or rotor blade system. In still some embodiments, depending on clearances and/or tolerances between the tip end of rotor blade and the inner face of a rotor duct of a given ducted rotor system, tip extensions may be installed and/or replaced for rotor blades without the removing rotor blades and/or the rotor duct.

Yet another advantage of embodiments described herein involving flexible rotor blade tip extensions may include providing for the ability for tip extensions to sweep across the rotor duct during unintended contact between tip extensions and the rotor duct without damaging the rotor blades or the duct. For example, during an unintended contact between flexible tip extensions and a rotor duct, deformation of the flexible elements of tip extensions may absorb energy caused by the contact, which may help to reduce loads from being transferred into the rotor duct and/or the rotor blades.

Figure 3:
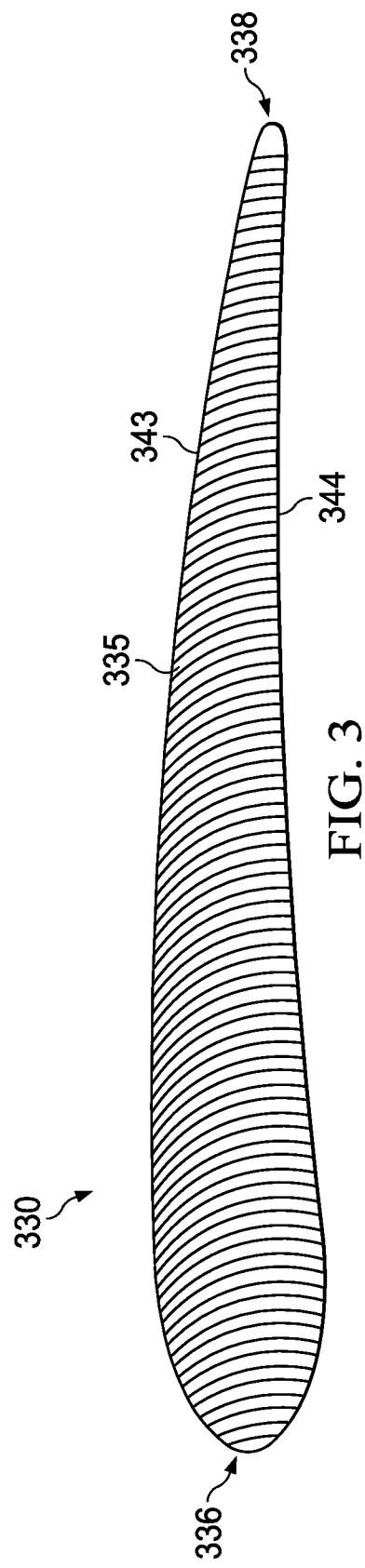
FIG. 3 is a simplified side view diagram illustrating example details that may be associated with another tip extension, in accordance with certain embodiments.

Referring to FIG. 3, FIG. 3 is a simplified side view diagram illustrating example details that may be associated with another tip extension 330, in accordance with certain embodiments. In at least one embodiment, tip extension 330 may include a leading edge 336, a trailing edge 338, a top surface 343, a bottom surface 344, and a plurality of flexible elements 335. For the embodiment of FIG. 3, flexible elements 335 may be curved between the top surface 343 and the bottom surface 344 of tip extension 330.

Figure 4A:
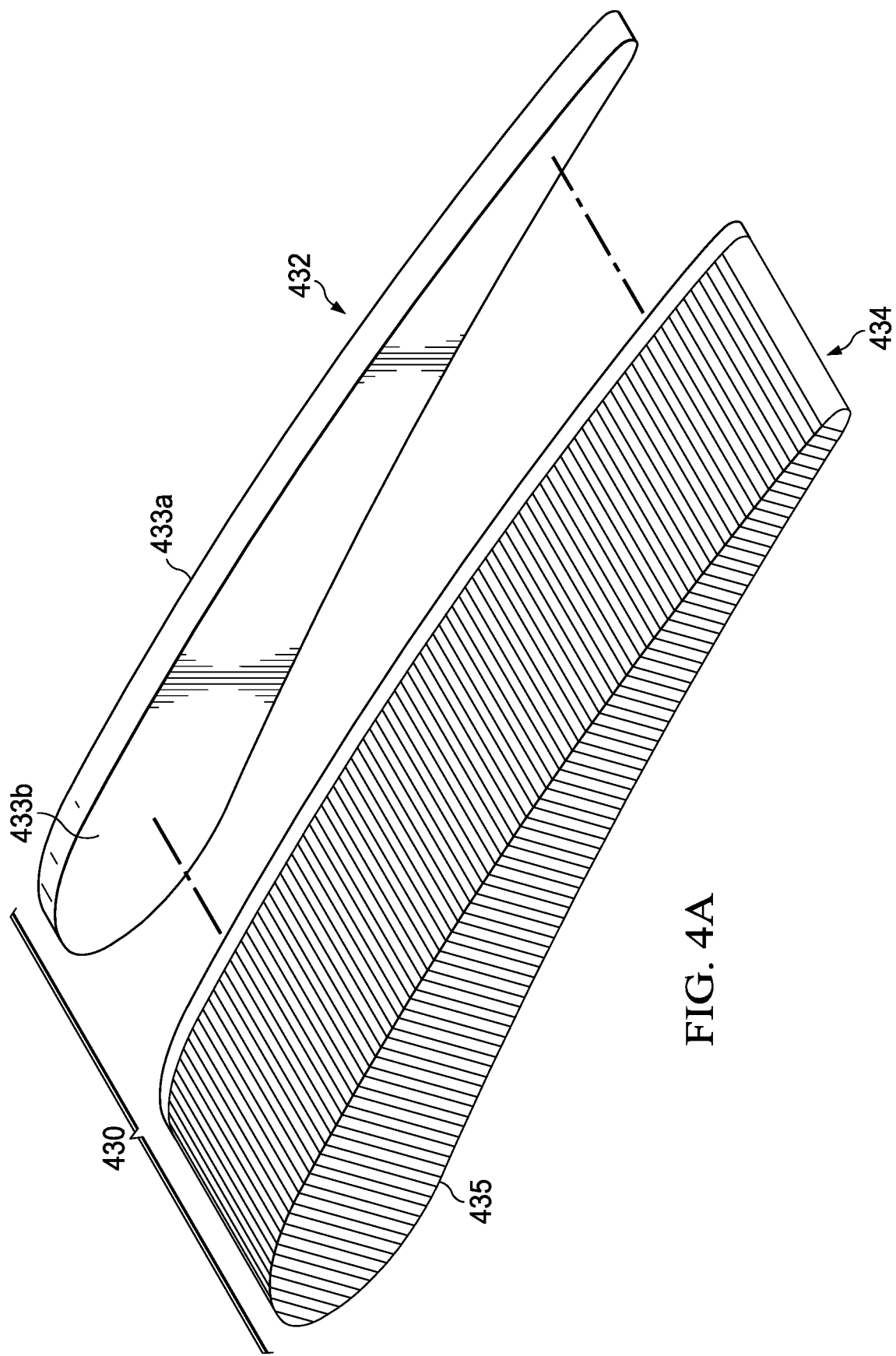
FIGS. 4A-4D are simplified diagrams illustrating example details that may be associated with another tip extension for a ducted rotor blade, in accordance with certain embodiments.

Referring to FIGS. 4A-4D, FIGS. 4A-4D are simplified perspective view diagrams illustrating example details that may be associated with another tip extension 430 for a ducted rotor blade 400, in accordance with certain embodiments. In at least one embodiment, as illustrated in FIG. 4A, tip extension may include an inboard end 432 made of a non-flexible material and an outboard end 434 made of a non-flexible material. Outboard end 434 may include a plurality of flexible elements 435. In various embodiments, flexible elements 435 may include any combination of features (e.g., straight cuts, curved cuts, etc.) discussed for any other flexible elements described herein. Inboard end 432 may have an inboard face 433a and an outboard face 433b.

Outboard end 434 of tip extension 430 may be affixed to the outboard face 433b of inboard end 432, as illustrated in FIG. 4A. In various embodiments, outboard end 434 may be affixed to inboard end 432 using adhesives, elevated temperature and/or pressure processes, combinations thereof, or the like.

Figure 4B:
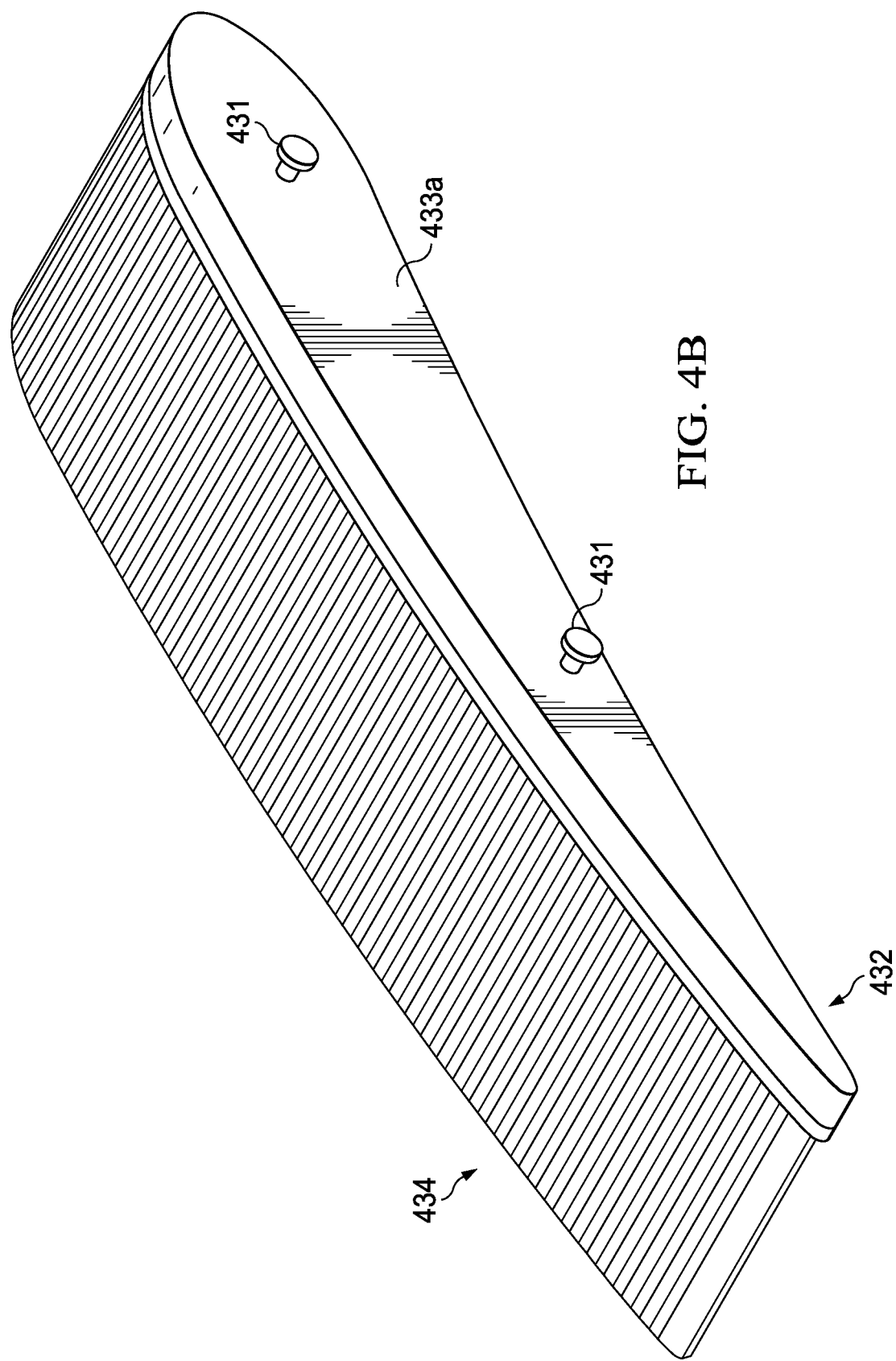

As illustrated in FIG. 4B, one or more attachment element(s) 431 may be configured for the inboard face 433a of inboard end 432. The one or more attachment element(s) 431 may be configured to facilitate affixing tip extension 430 to ducted rotor blade 400. For the embodiment of FIGS. 4A-4C, attachment element(s) 431 may be post or stud structures configured for the inboard face 433a of inboard end 432.

Figure 4C:
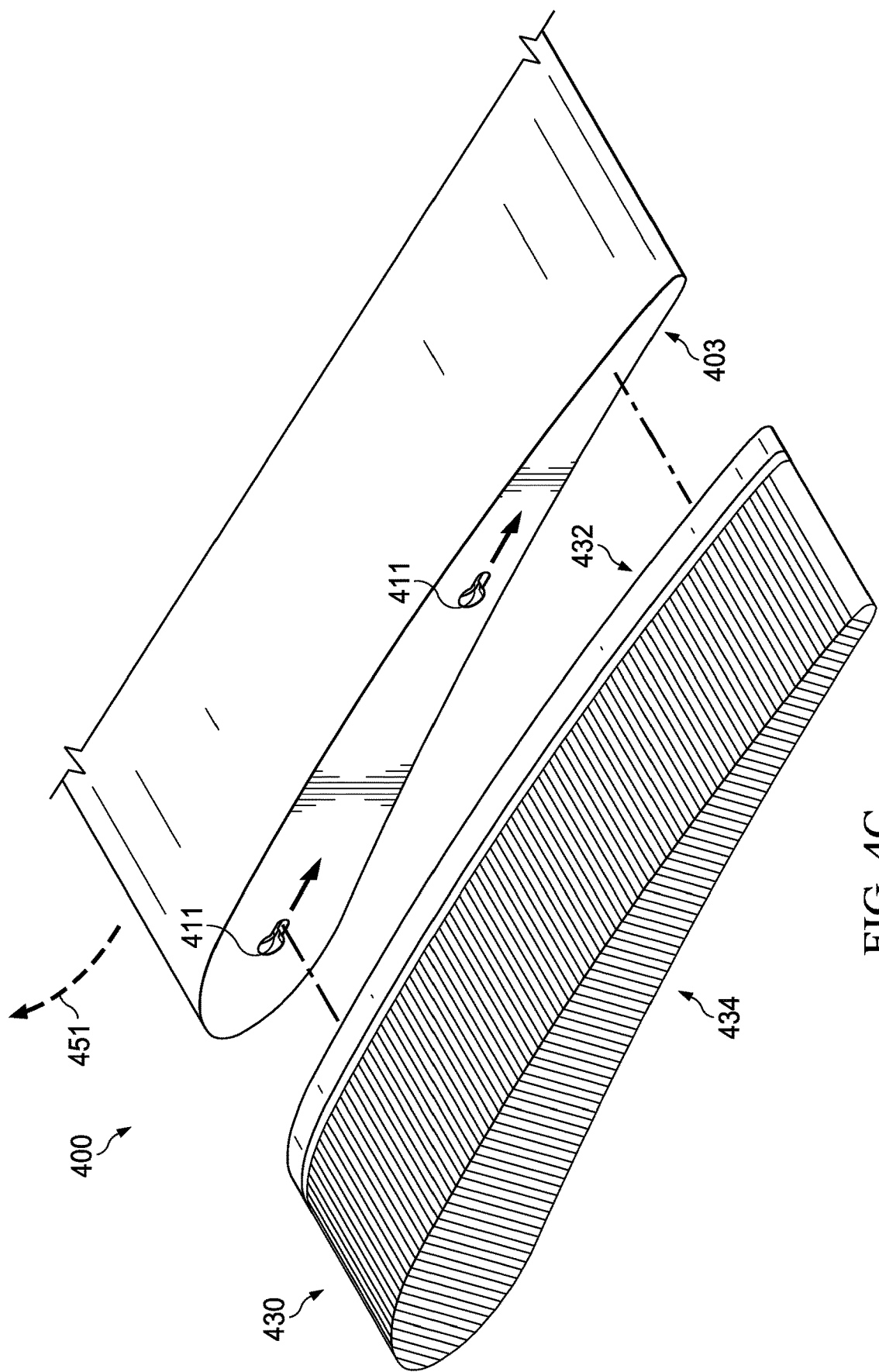
Figure 4D:
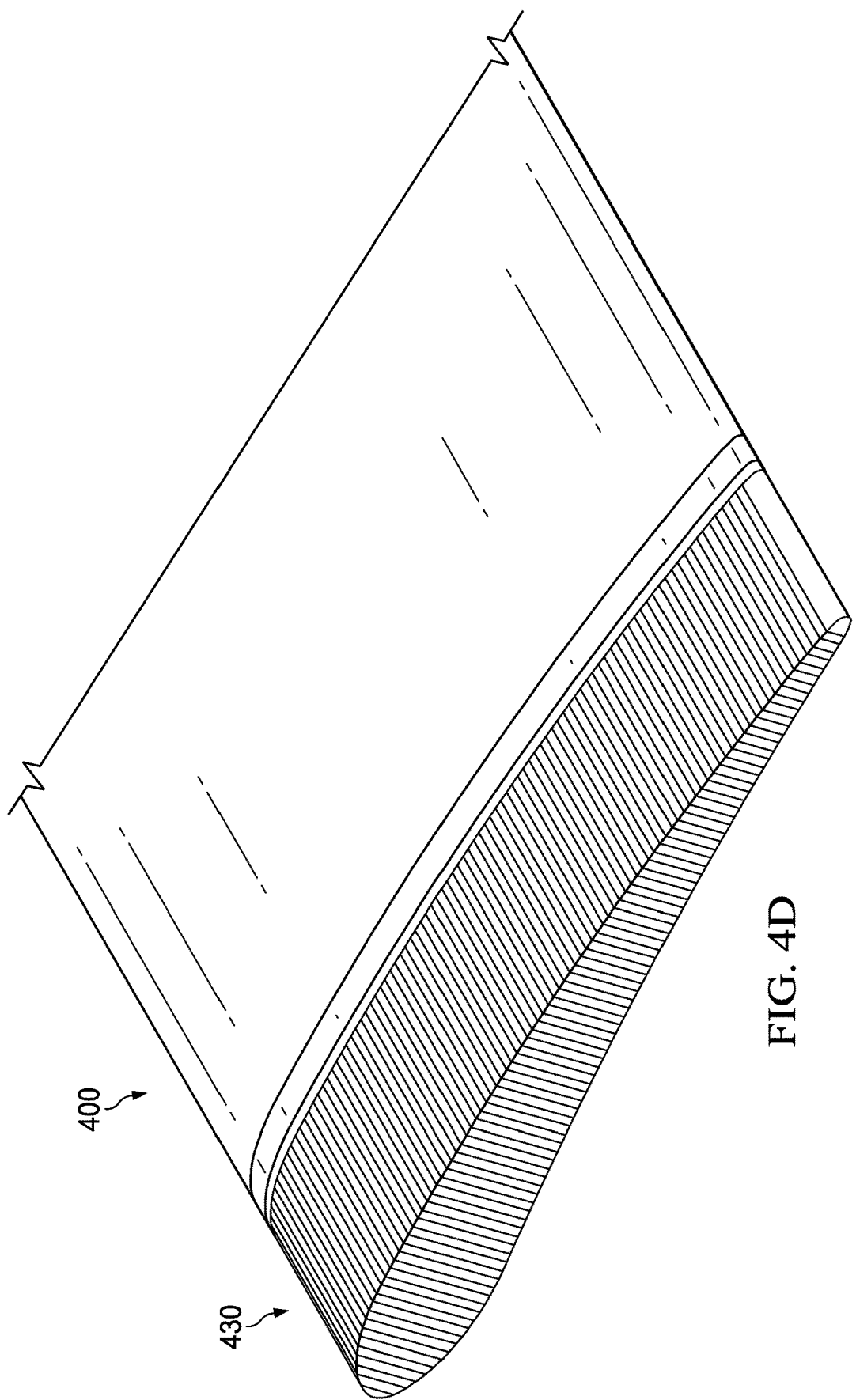

As illustrated in FIG. 4C, mating attachment element(s) 411 (e.g., interlocking slots) may be provided for a tip end 404 of ducted rotor blade 400 to facilitate affixing tip extension 430 to the tip end 404 of the ducted rotor blade 400. In at least one embodiment, attachment element(s) 431 provided for tip extension 430 and mating attachment element(s) 411 provided for tip end 404 of ducted rotor blade 400 may include features that provide for improved mechanical attachment between tip extension 430 and ducted rotor blade 400 based on the expected direction of rotation (e.g., generally indicated by dashed-line arrow 451) for the ducted rotor blade 400. For example, posts provided for a tip extension and interlocking slots provided for a rotor blade tip end may be configured such that the posts and slots interlock together based on the expected direction of rotation for the rotor blade during operation. The assembled ducted rotor blade 400 including tip extension 430 is illustrated in FIG. 4D.

The example attachment techniques, tip extension features, and/or rotor blade features discussed herein for affixing a tip extension to a rotor blade are only a few of the many means or methods that may be used to mechanically affix a tip extension to a rotor blade and are not meant to limit the broad scope of the present disclosure. Virtually any other means or methods may be used to mechanically affix a tip extension to a ducted rotor blade for a ducted rotor system and, thus, are clearly within the scope of the present disclosure.

Figure 5C:
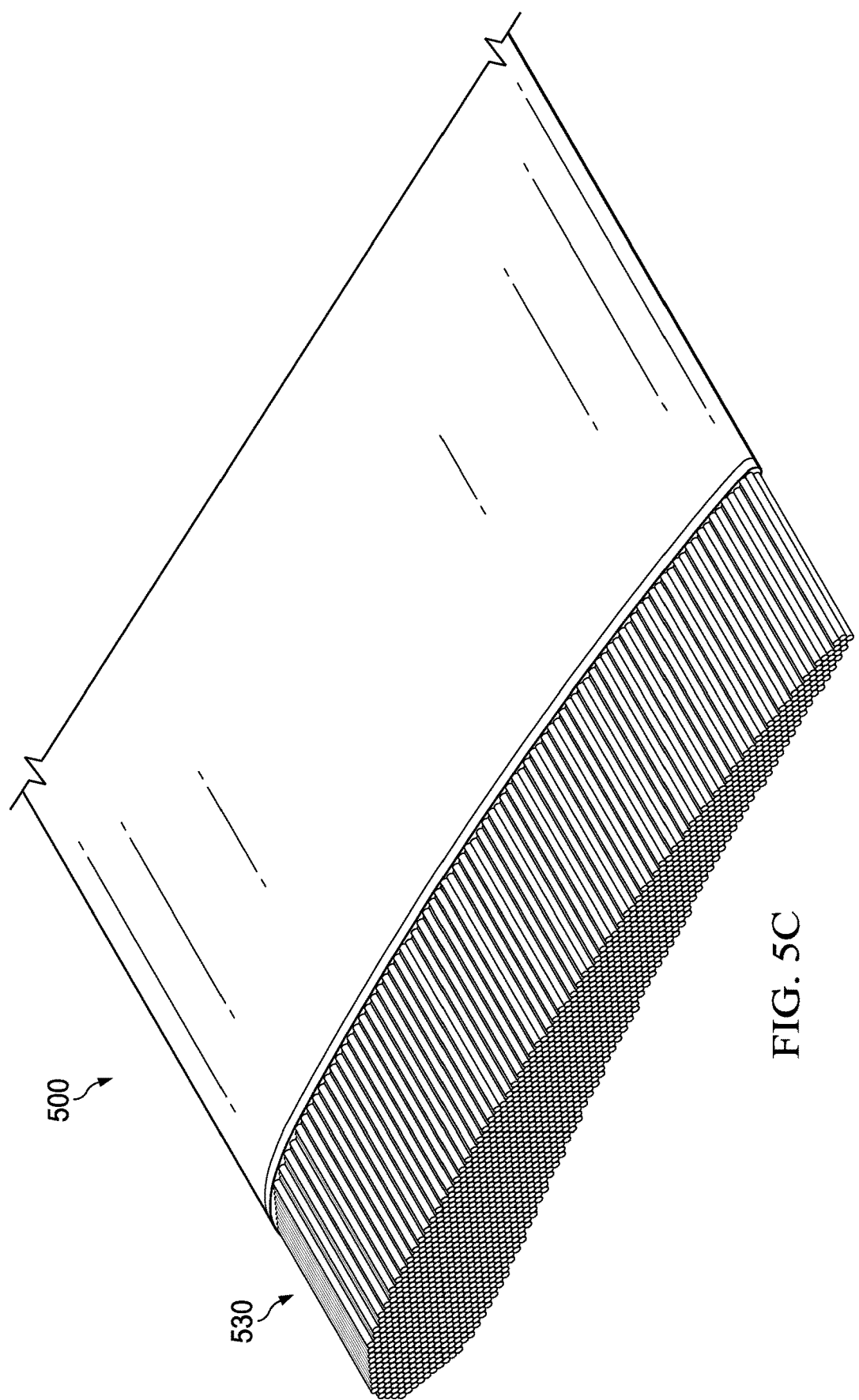

Referring to FIGS. 5A-5C, FIGS. 5A-5C are simplified diagrams illustrating example details that may be associated with another tip extension 530 and ducted rotor blade 500, in accordance with certain embodiments. In at least one embodiment, as illustrated in FIGS. 5A-5B, tip extension 530 may include an inboard end 532, an outboard end 534, a leading edge 536, a trailing edge 538, and a plurality of flexible elements 535. For the embodiments of FIGS. 5A-5C, the plurality of flexible elements 535 are flexible bristles that are fused together along the inboard end 532 of the tip extension 530. In various embodiments, the flexible bristles may have any suitable diameter depending on applications and/or implementations that may allow the flexible bristles to deform in cases of unintended contact with a rotor duct while also deflecting air rather than allowing it to pass through the deformed bristles. As illustrated in FIG. 5C, the inboard end 532 of tip extension 530 can be affixed to the tip end of ducted rotor blade 500 (e.g., using adhesives or some other means for affixing the tip extension 530 to the ducted rotor blade 500).

Figure 6A:
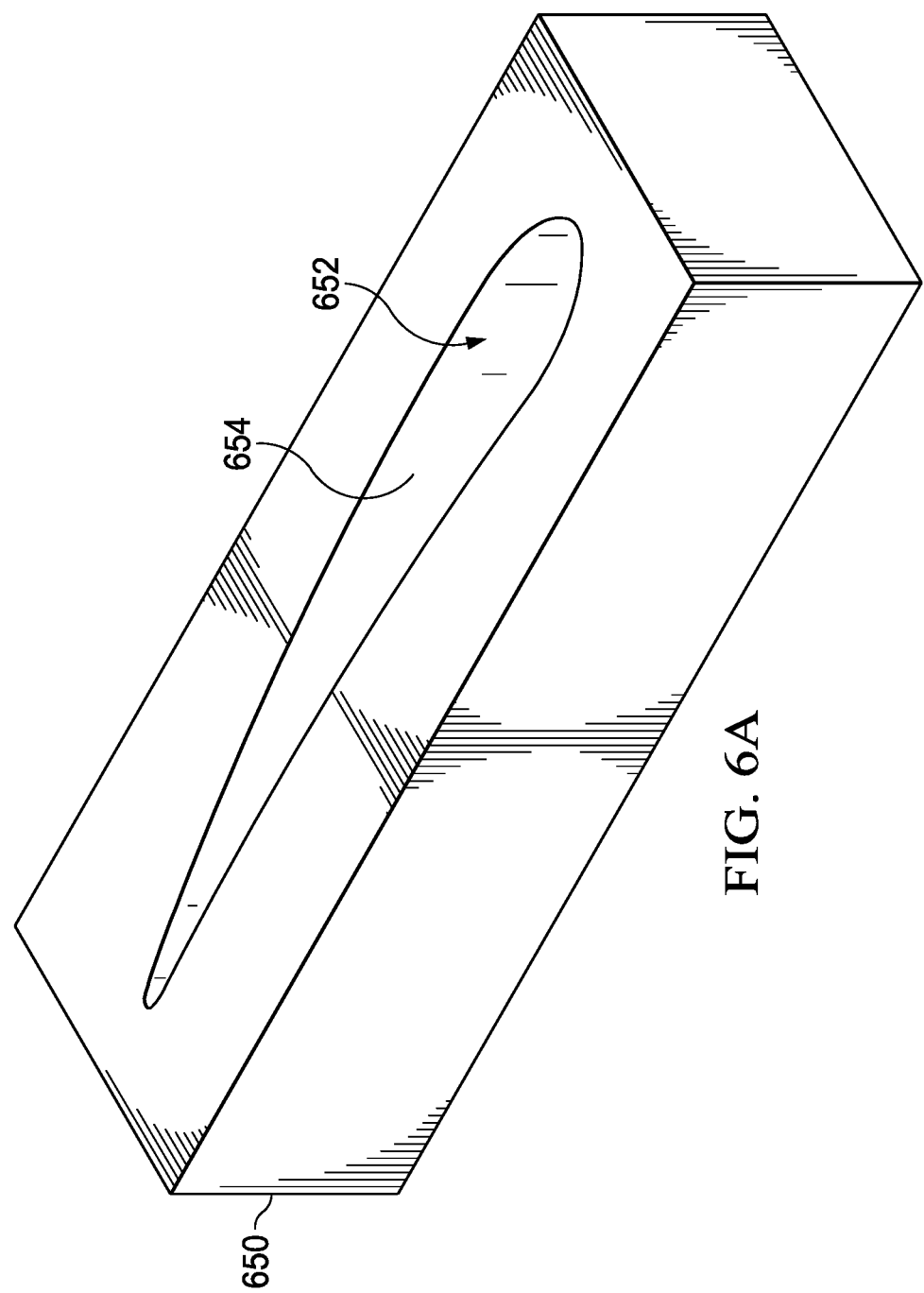
FIGS. 6A-6H are simplified diagrams illustrating example details that may be associated with forming a tip extension having flexible bristles fused together, in accordance with certain embodiments.

Referring to FIGS. 6A-6H, FIGS. 6A-6H are simplified diagrams illustrating example details that may be associated with forming a tip extension 630 having flexible elements that are flexible bristles 635 that are fused together, in accordance with certain embodiments. Referring to FIG. 6A, a mold 650 may be provided in which the mold 650 includes a cavity 652 that has an outer mold line (OML) 654 that matches the OML of a ducted rotor blade 600 (FIG. 6H) to which the tip extension 630 is to be affixed.

Figure 6B:
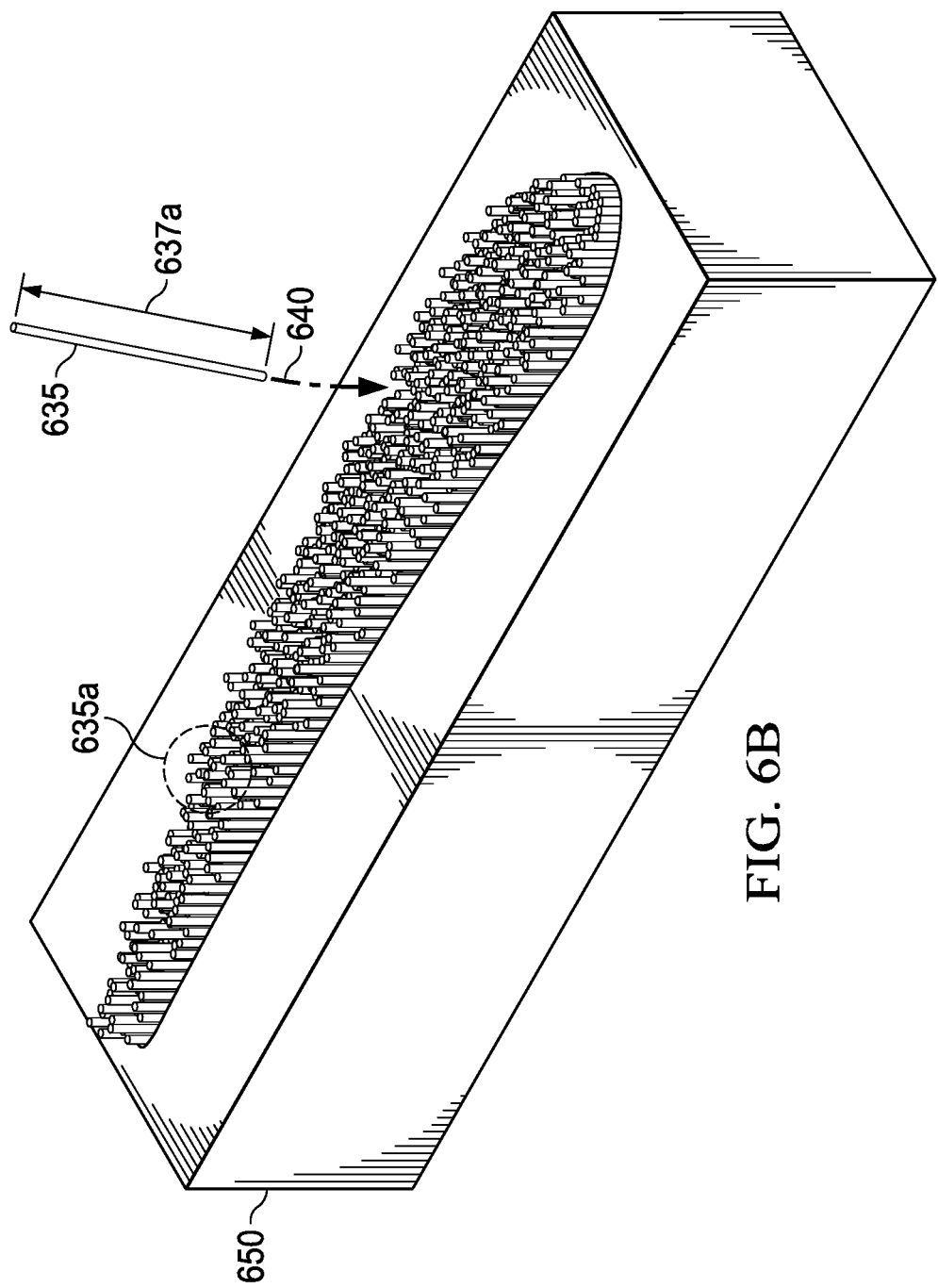

Referring to FIG. 6B, the cavity 652 is filled (640) with flexible elements, which for the embodiment of FIGS. 6A-6H are flexible bristles 635. In various embodiments, the cavity 652 can be filled (640) with the flexible bristles 635 by hand, by a machine, or combinations thereof. The flexible bristles 635 may have an initial length 637a that is greater than the depth of the cavity 652 of the mold 650 such that the flexible bristles 635 have exposed ends (635a) that extend outward from the cavity 652. The initial length 637a of the each of the flexible bristles 635 can be the same or different.

Figure 6C:
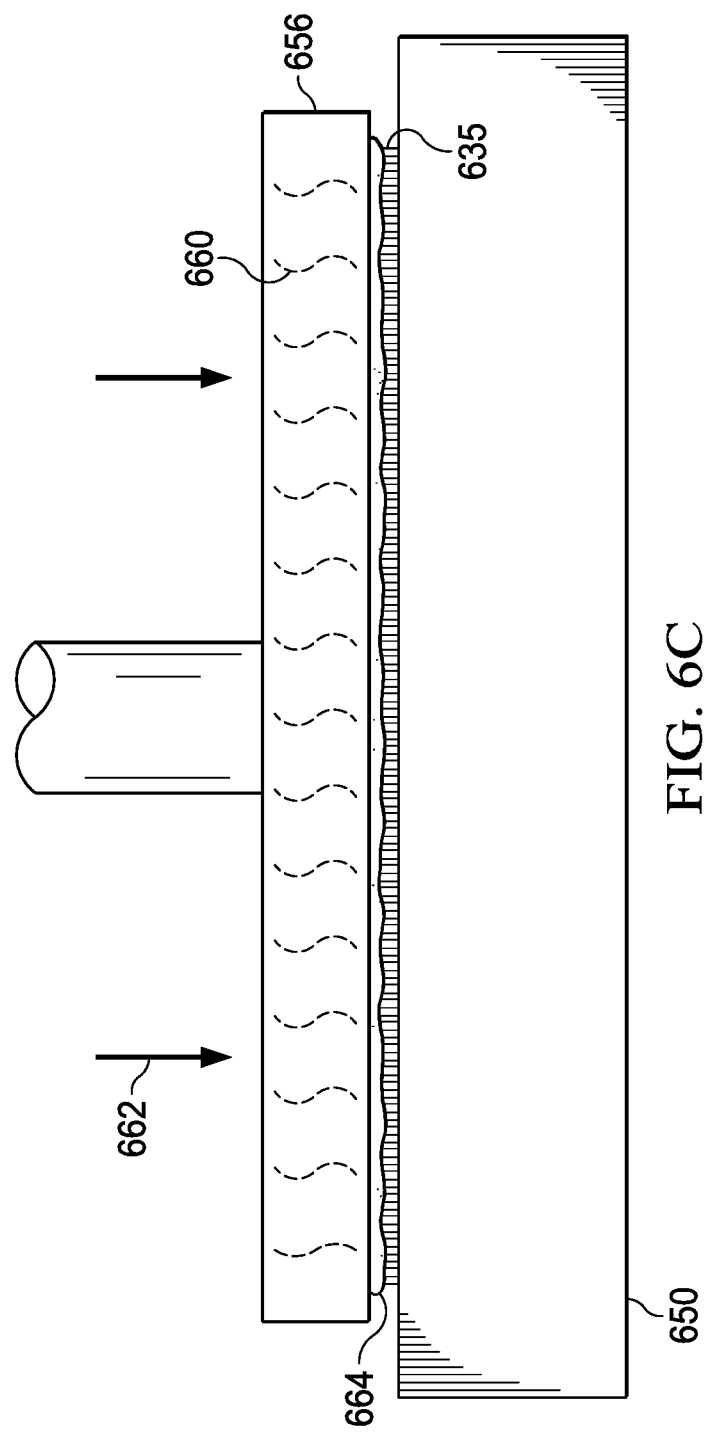
Figure 6D:
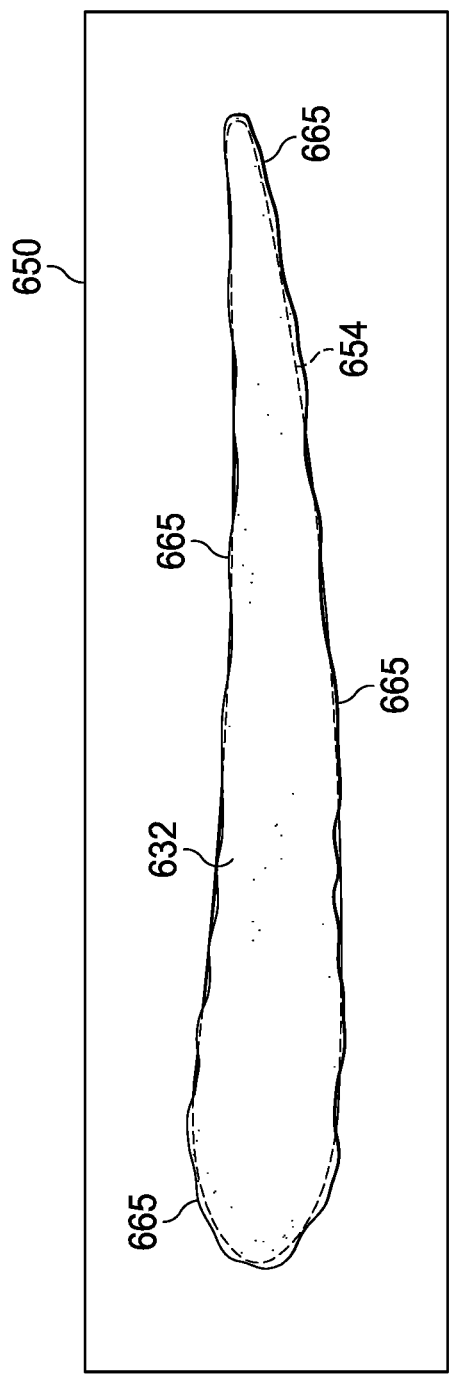

Referring to FIG. 6C, a tool 656 may be used to apply a heat 660 (e.g., high enough to melt the flexible bristles 635) and a pressure 662 (toward the mold 650) that causes the exposed ends 635a of flexible bristles 635 to melt and be fused together (664) to form an inboard end 632 of tip extension 630. In various embodiments, tool 656 may be an iron, an autoclave, or any other tool that may be capable of applying pressure and heat, in order to fuse flexible bristles 635 together. Excess melted bristle material 665 (as shown at least in FIG. 6D) may extend beyond the OML 654 of the mold cavity 652. The excess melted bristle material 665 can be removed at a later time, as discussed below.

Figure 6E:
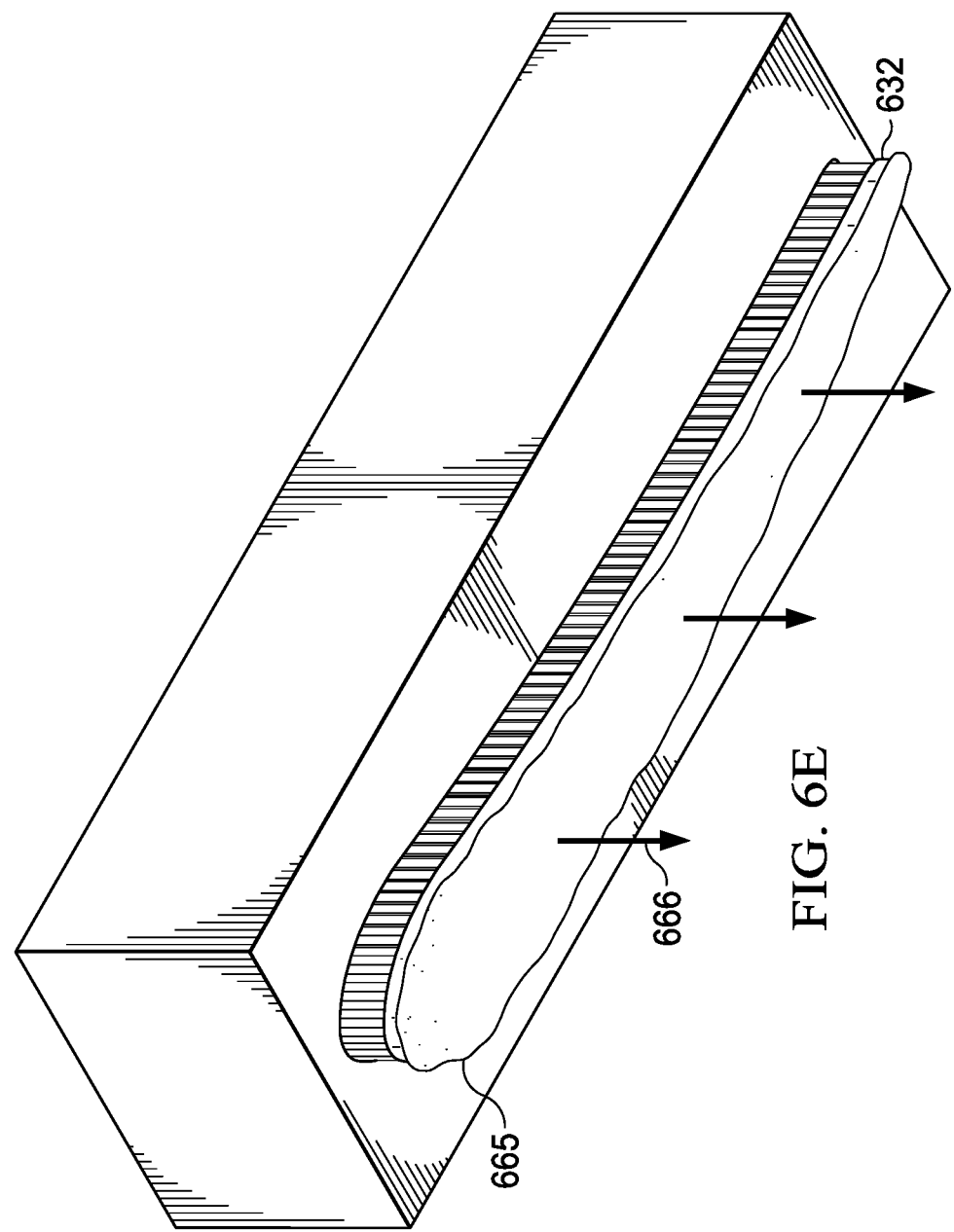
Figure 6F:
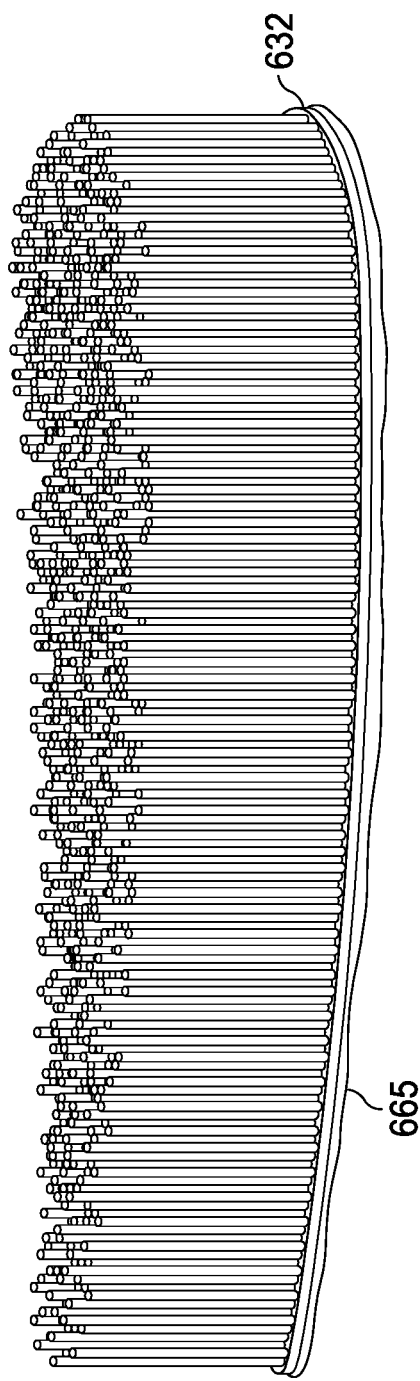
Figure 6G:
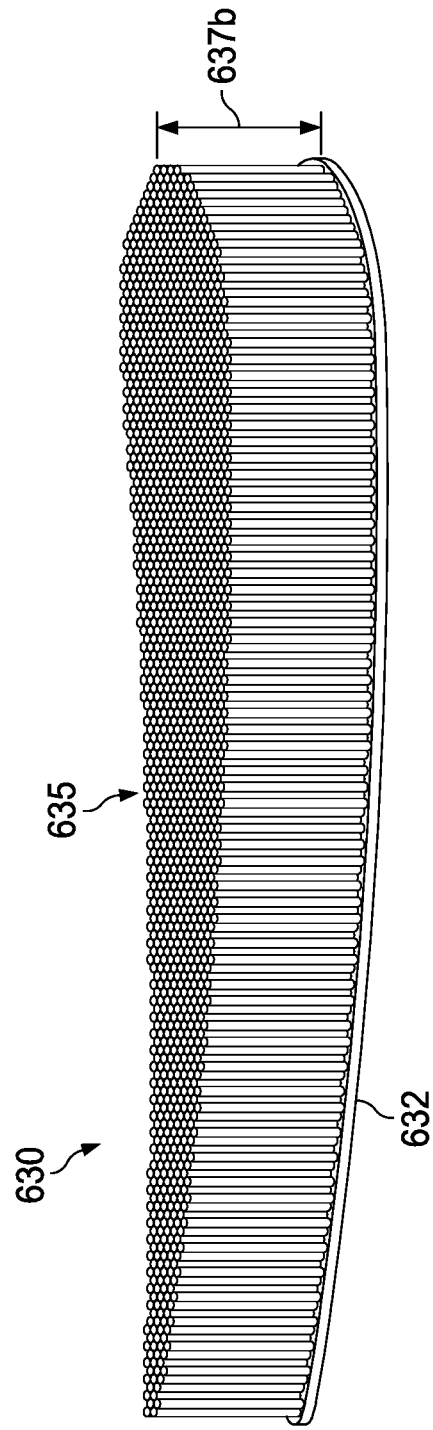
Figure 6H:
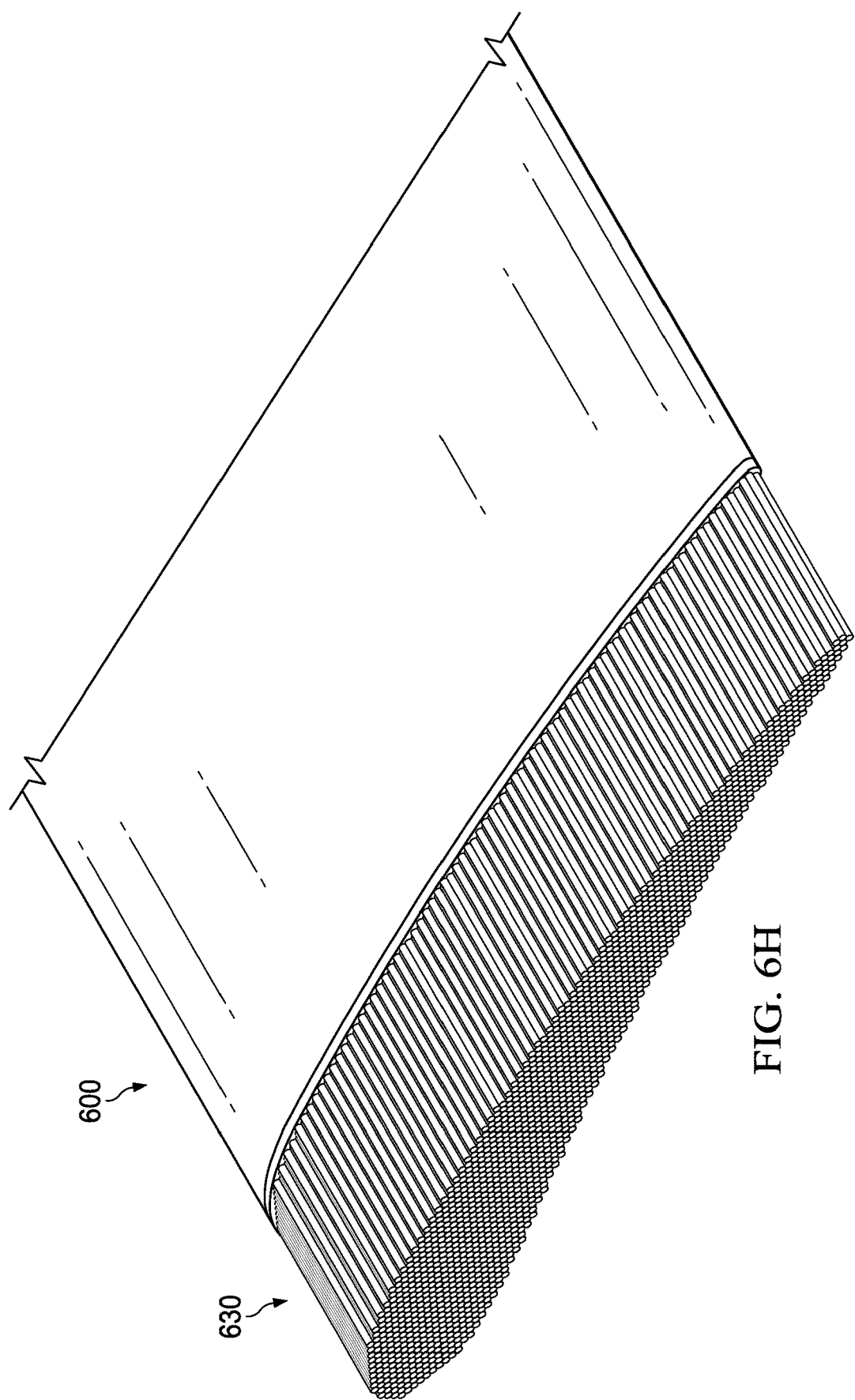

As illustrated in FIG. 6E, the fused together flexible bristles 635 can be removed (666) from the mold 650 (e.g., after they have cooled). FIG. 6F illustrates the fused together flexible bristles 635 following removal (666) from the mold 650. In at least one embodiment, the flexible bristles 635 can be cut to a designed length 637b (as shown in FIG. 6G) and the excess fused material 665 can removed from inboard end 632 to form tip extension 630. As illustrated in FIG. 6H, tip extension 630 can be affixed to ducted rotor blade 600 (e.g., using adhesives, etc.).

As discussed above, flexible bristles for a tip extension can also be coupled or otherwise banded together using a sealant. Referring to FIGS. 7A-7H, FIGS. 7A-7H are simplified diagrams illustrating example details that may be associated with forming a tip extension 730 having flexible elements that are flexible bristles 735, which are banded together using a sealant, in accordance with certain embodiments.

Figure 7A:
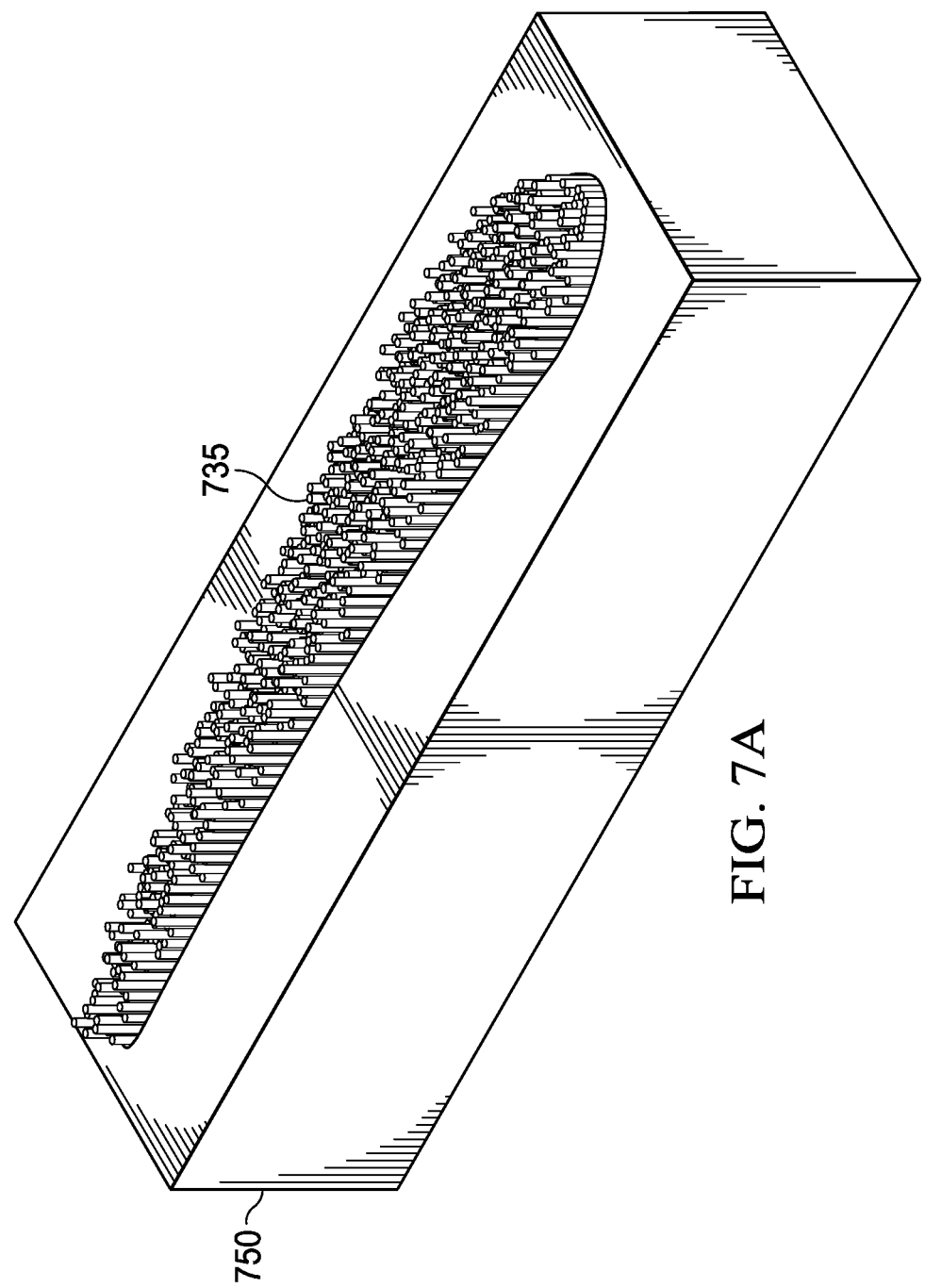
FIGS. 7A-7H are simplified diagrams illustrating example details that may be associated with forming a tip extension having flexible bristles banded together, in accordance with certain embodiments.
Figure 7B:
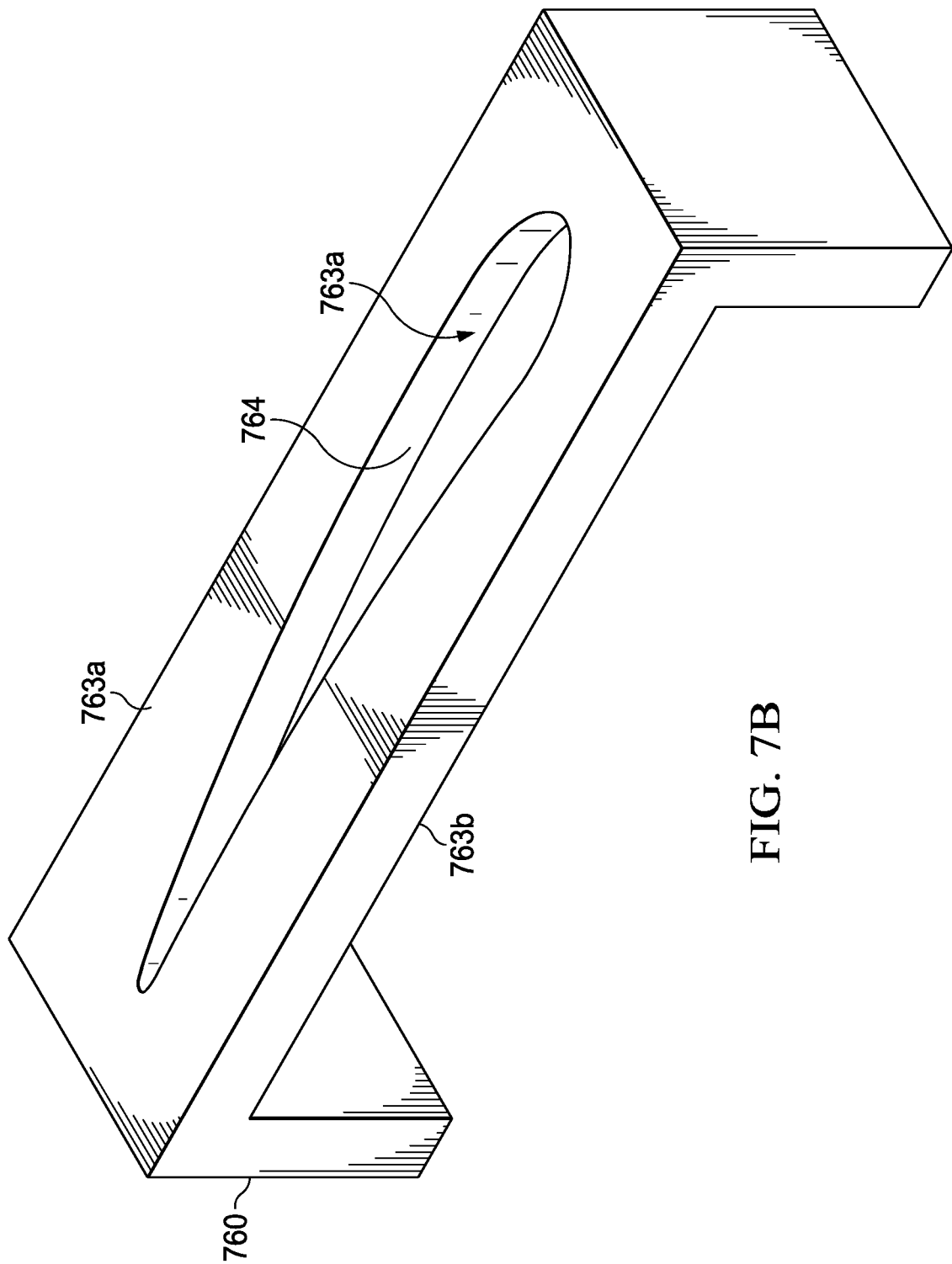
Figure 7C:
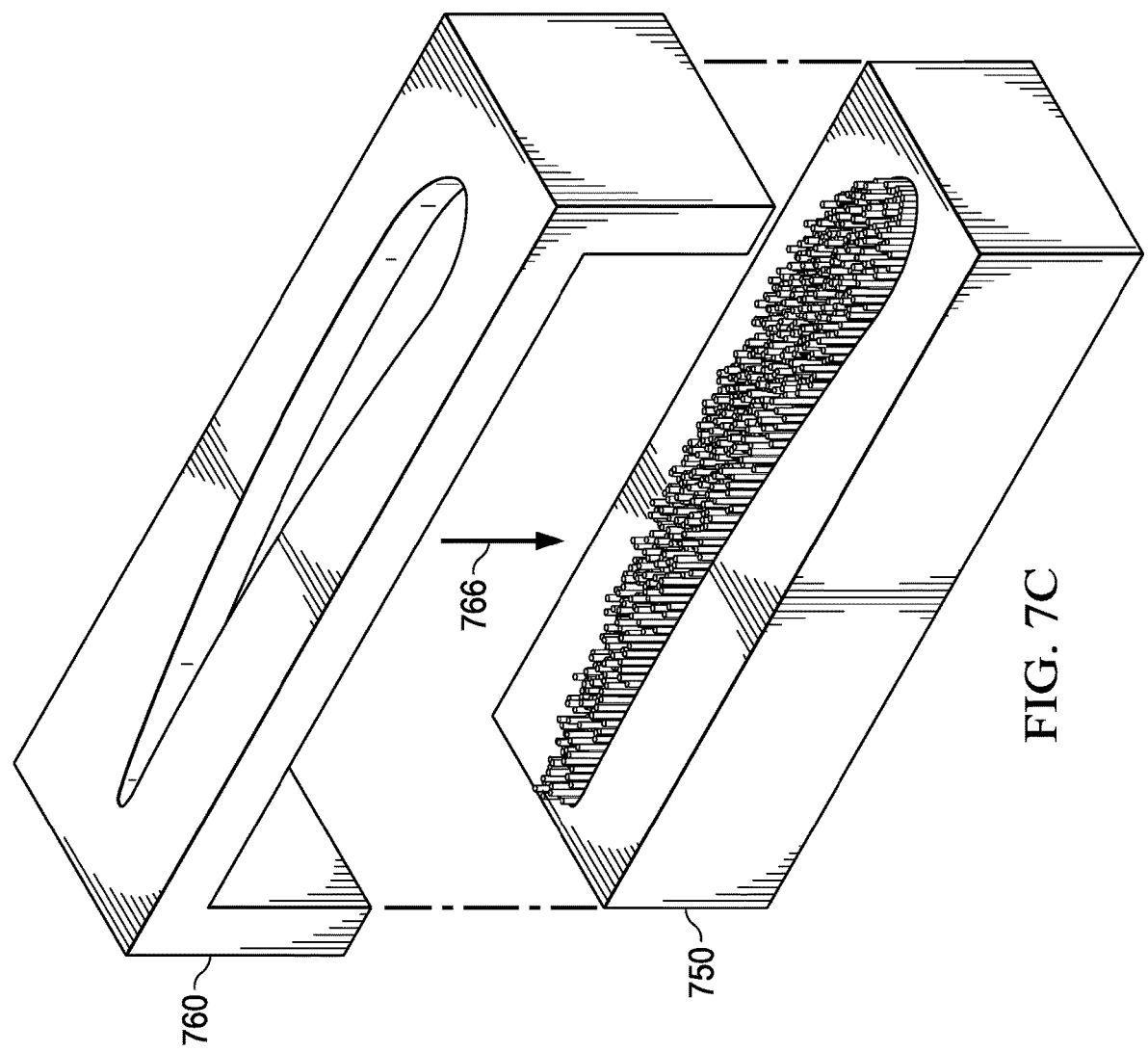
Figure 7D:
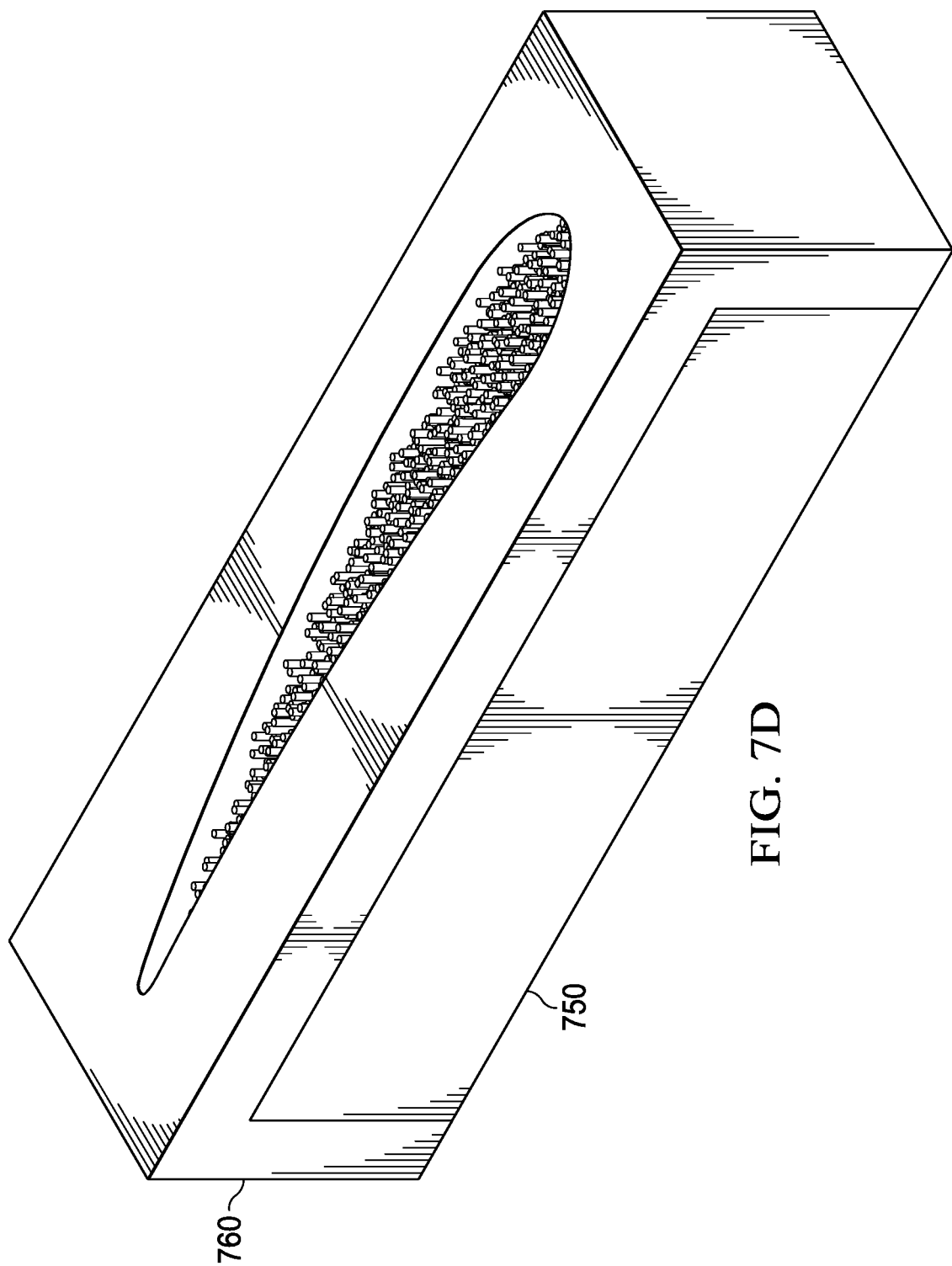

As illustrated in FIG. 7A, a mold 750 having a cavity (not labeled) that has an OML (also not labeled) that matches the OML of a rotor blade 700 (FIG. 7H) to which the tip extension 730 is to be affixed can be filled with the plurality of flexible bristles 735 using any methods as discussed above for FIG. 6B. As illustrated in FIG. 7B, a sealant mold 760 may be provided in which the sealant mold 760 includes a cavity 762 that extends entirely between a top surface 763a and a bottom surface 763b of the sealant mold 760 and that has an OML 764 that matches the OML of mold 750 (and of the rotor blade 700). As illustrated in FIGS. 7C-7D, the sealant mold 760 may be positioned over and lowered (766) onto mold 750 such that exposed ends of flexible bristles 735 extend through cavity 762.

Figure 7E:
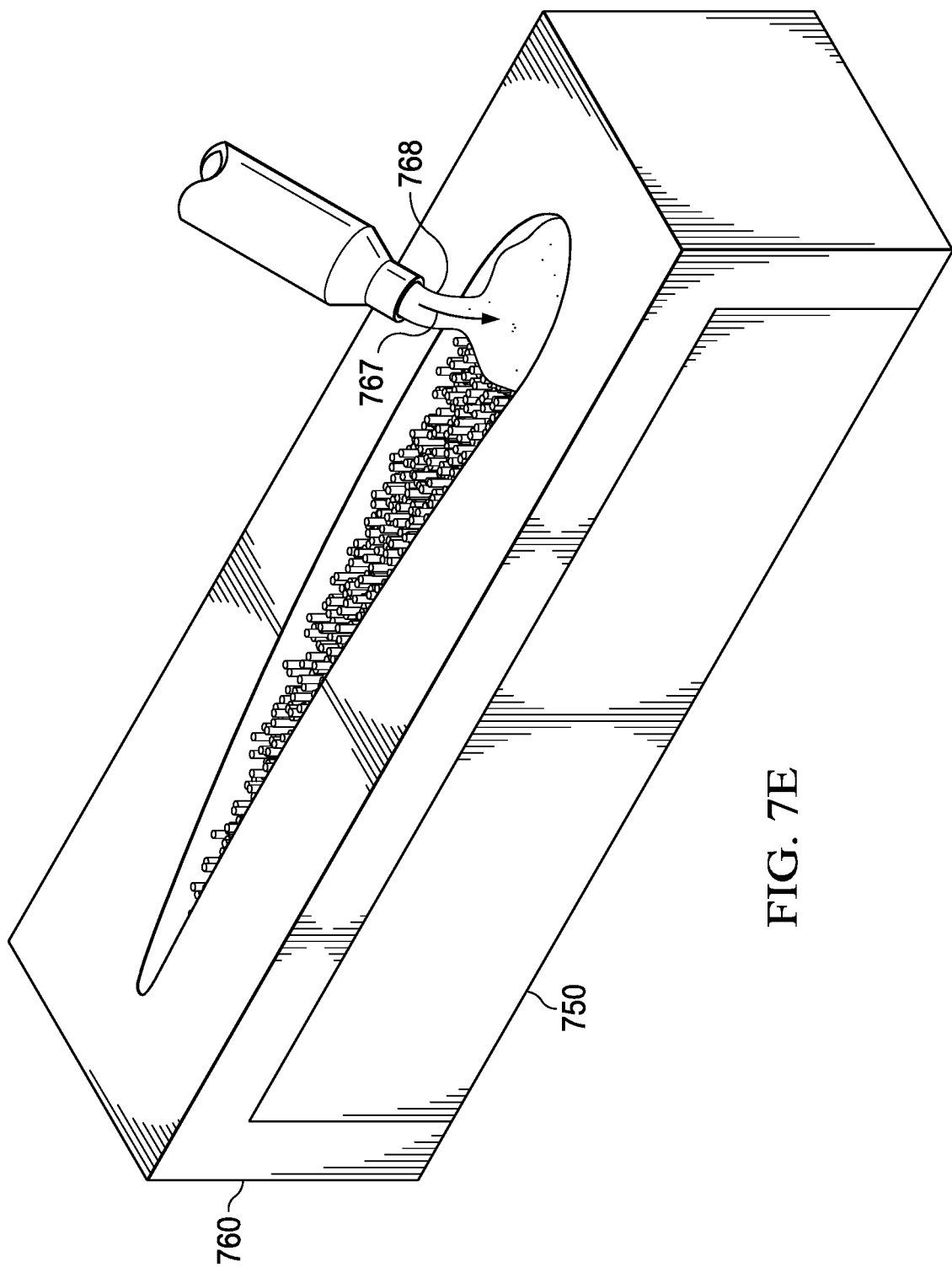
Figure 7F:
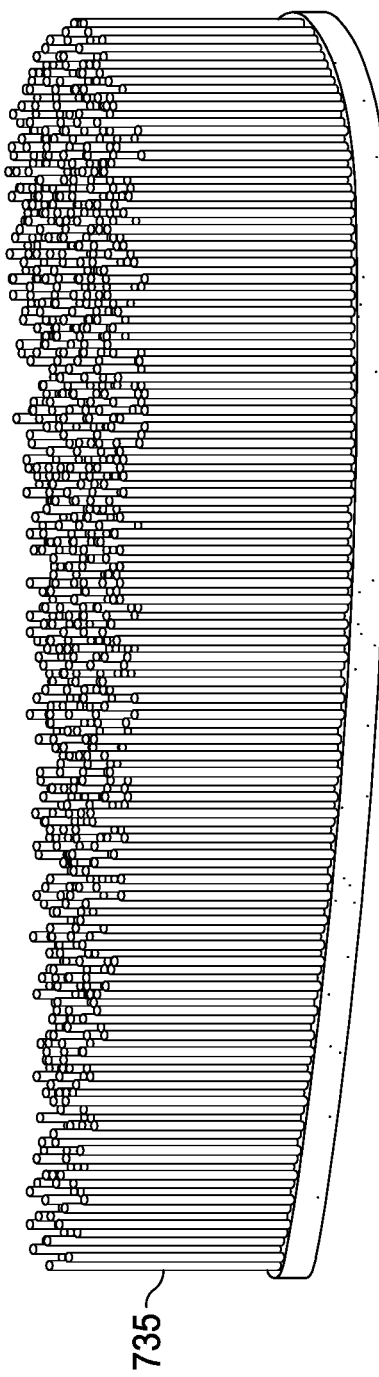
Figure 7G:
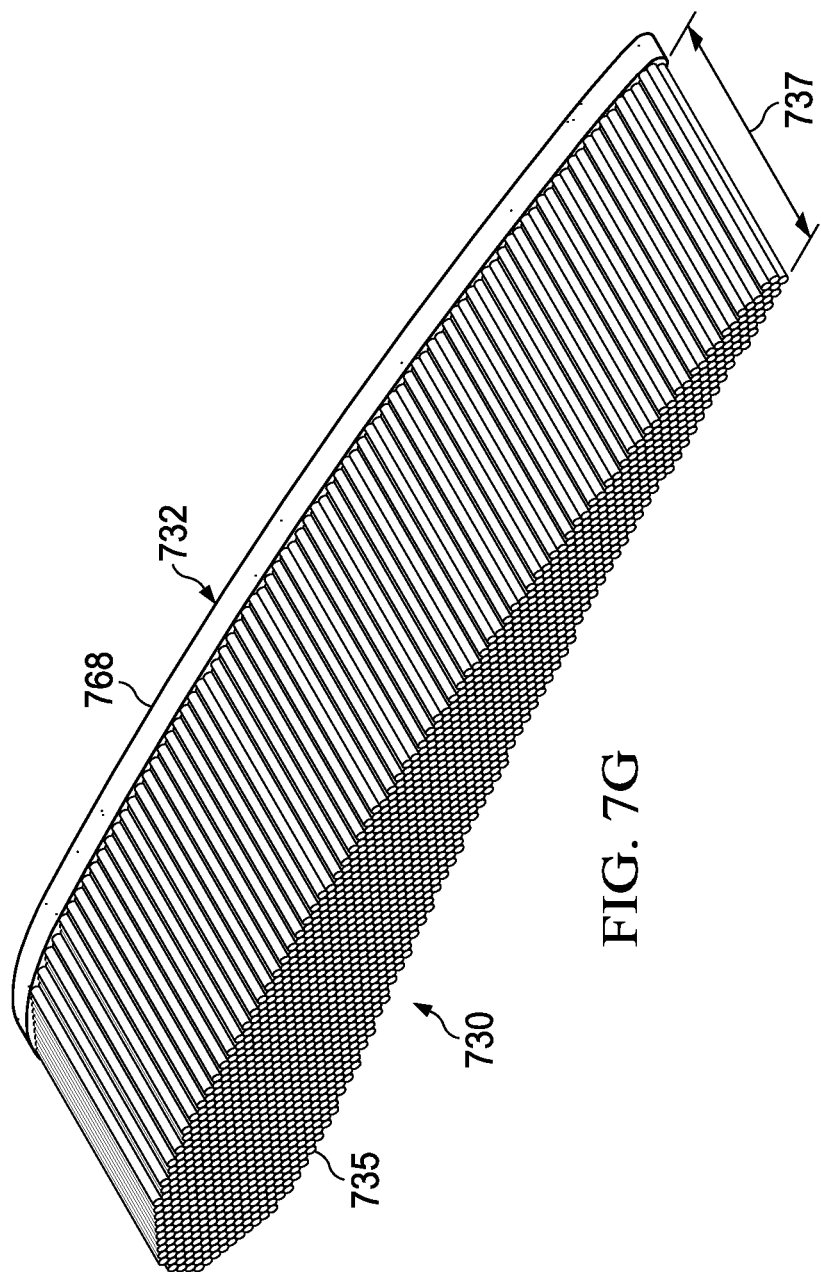
Figure 7H:
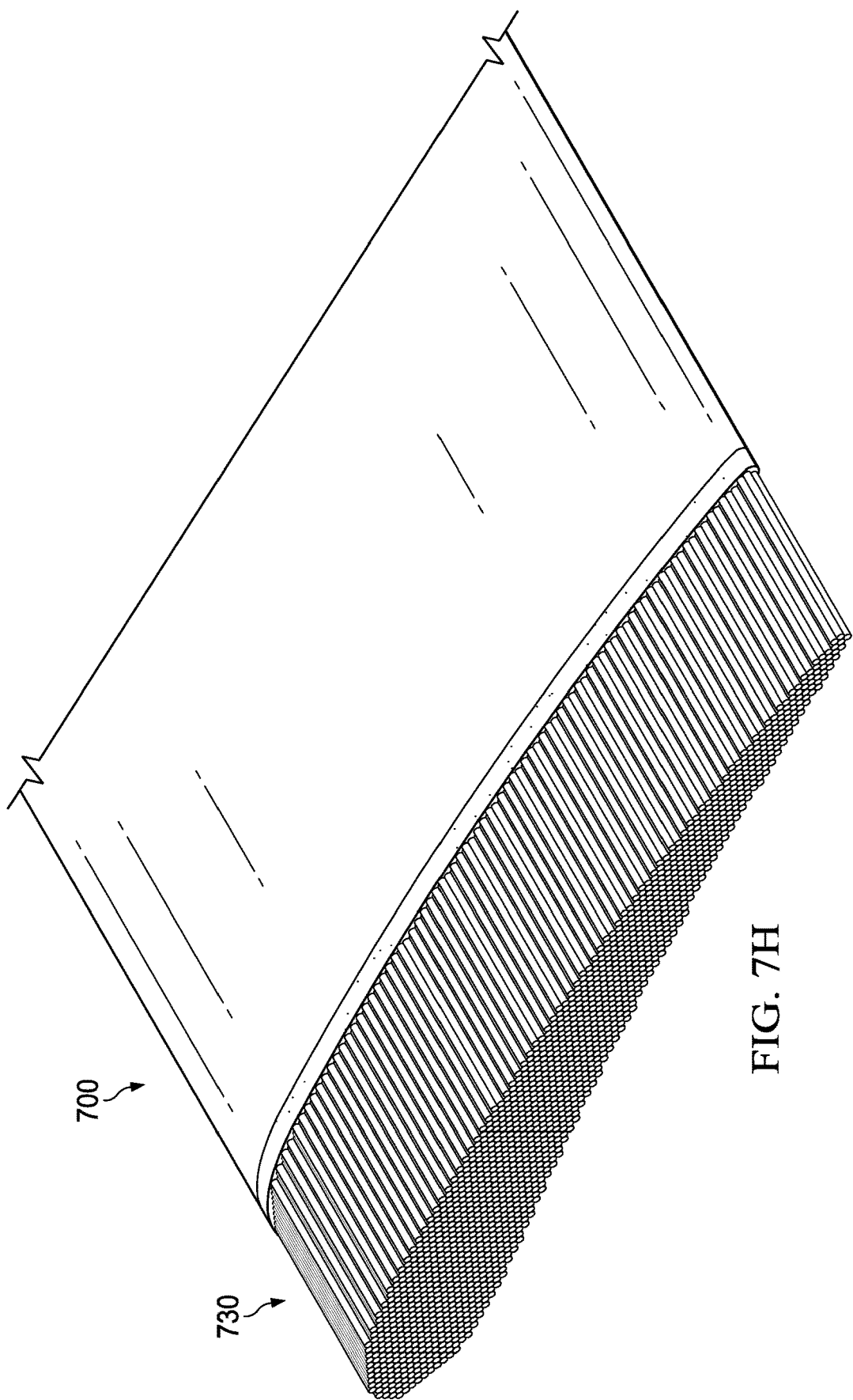

As illustrated in FIG. 7E, the cavity 762 of the sealant mold 760 is filled (767) with a sealant 768. In various embodiments, the sealant to fill the cavity 762 of sealant mold 760 may be provided by hand, by a machine, or any combination thereof. As illustrated in FIG. 7F, the coupled together flexible bristles 735 can be removed from the sealant mold 760 and mold 750 (e.g., after the sealant has dried, been cured, etc.). In at least one embodiment, the flexible bristles 735 can be cut to a designed length 737 (as shown in FIG. 7G) and any excess sealant 768 can removed to form an inboard end 732 for tip extension 730, which can be affixed to rotor blade 700, as shown in FIG. 7H.

In various embodiments, tip extensions formed from materials such as silicon rubber or the like as discussed herein (e.g., tip extension 230, tip extension 330, and tip extension 430) may be formed using an suitable processes such as, for example, compression molding, injection molding, composite fabrication, combinations thereof, or the like in which the flexible material may be formed in a mold, machined to any remove excess material or cut to desired length, cut to have flexible elements of any designed shape, and may be any suitable size and/or shape based on the rotor blades to which they are to be affixed.

Figure 8:
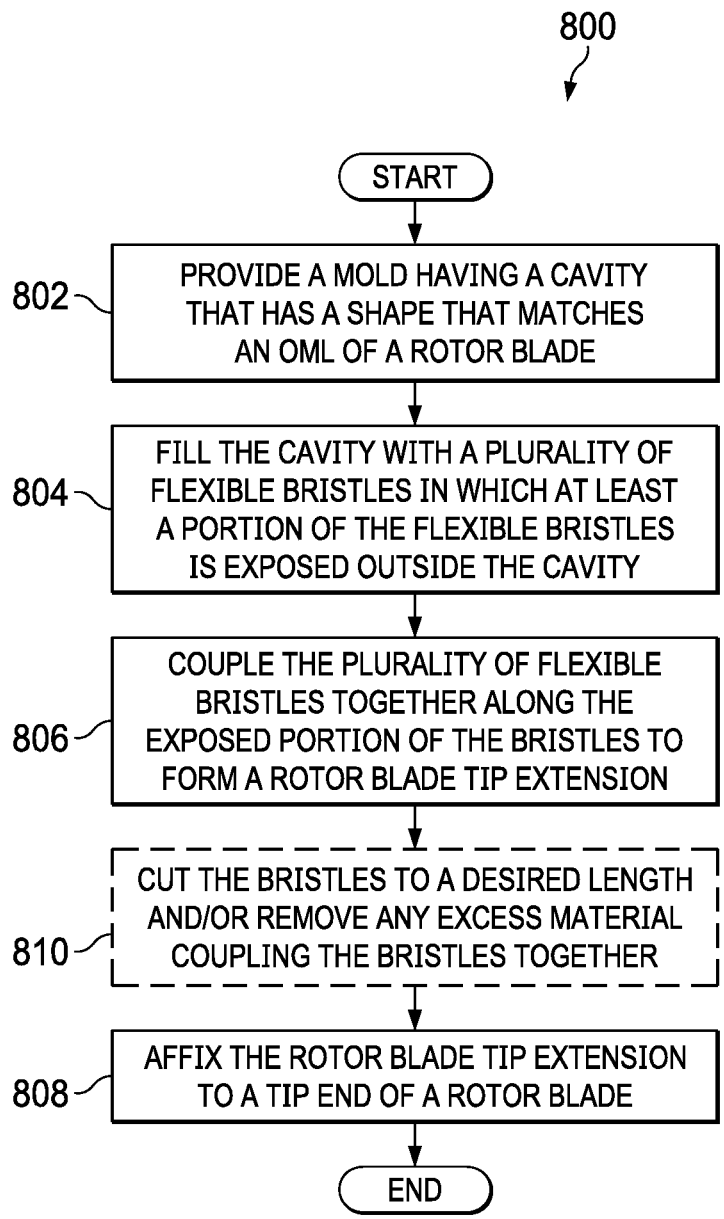
FIG. 8 is a simplified flowchart illustrating example details that may be associated with forming a tip extension having flexible bristles, in accordance with certain embodiments.

Referring to FIG. 8, FIG. 8 is a simplified flowchart 800 illustrating example details that may be associated with forming a tip extension having flexible bristles, in accordance with certain embodiments. In at least one embodiment, flowchart 800 may begin at block 802 by providing a mold having a cavity that has a shape that matches an OML of a rotor blade. The flowchart may proceed to 804 by filling the cavity with a plurality of flexible bristles in which at least a portion of the flexible bristles is exposed. The flowchart may proceed to 806 by coupling the plurality of flexible bristles together along the exposed portion of the bristles to form a rotor blade tip extension. The flowchart may proceed to 808 by affixing the rotor blade tip extension to a tip end of a rotor blade. In some embodiments, the affixing can include affixing the tip extension to the rotor blade using an adhesive.

In some embodiments, the coupling at 804 may include applying a heat and a pressure along the exposed portion of the bristles in order to fuse at least a portion of the bristles together (e.g., as discussed for the embodiment of FIGS. 6A-6G). In other embodiments, the coupling at 804 may include providing a sealant mold over the exposed portion of the bristles and a applying a sealant along the exposed portion of the bristles that are within the sealant mold (e.g., as discussed for the embodiment of FIGS. 7A-7G).

In some embodiments, the flowchart may include cutting the bristles to a desired length and/or removing any excess material that is coupling bristles together, as shown at 810, prior to affixing the rotor blade tip extension to the tip end of the rotor blade. In at least one embodiment, the flowchart may be completed following the affixing at 808. In some embodiments, however, the flowchart may restart and/or certain blocks may be repeated.

The flowcharts diagrams in the FIGURES illustrate the architecture, functionality, and/or operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of', 'one or more of', and the like can be represented using the '(s)' nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor system comprising:
a rotor duct;
at least one rotor blade, wherein the at least one rotor blade comprises a tip end; and
a tip extension affixed at the tip end of the at least one rotor blade, wherein the tip extension comprises a plurality of flexible elements and the rotor blade has a fixed extended length based on the tip extension,
wherein the tip extension covers an entirety of an outboard surface of the tip end and a cross-section of the tip extension comprises an airfoil shape.

2. The rotor system of claim 1, wherein the tip extension provides a clearance distance between the tip extension and the rotor duct.

3. The rotor system of claim 1, wherein the flexible elements are flexible bristles that are fused together along an inboard end of the tip extension.

4. The rotor system of claim 1, wherein the flexible elements are flexible bristles that are banded together along an inboard end of the tip extension.

5. The rotor system of claim 4, wherein the flexible bristles are banded together using a sealant.

6. The rotor system of claim 1, wherein the tip extension has a shape that matches a shape of the at least one rotor blade.

7. The rotor system of claim 1, wherein the tip extension is affixed to the tip end of the rotor blade with an adhesive.

8. An aircraft comprising:
a fuselage; and
at least one rotor system, the at least one rotor system comprising:
a rotor duct;
at least one rotor blade, wherein the at least one rotor blade comprises a tip end; and
a tip extension affixed at the tip end of the at least one rotor blade, wherein the tip extension comprises a plurality of flexible elements and the rotor blade has a fixed extended length based on the tip extension extension,
wherein the tip extension covers an entirety of an outboard surface of the tip end and a cross-section of the tip extension comprises an airfoil shape.

9. The aircraft of claim 8, wherein the tip extension provides a clearance distance between the tip extension and the rotor duct.

10. The aircraft of claim 8, wherein the flexible elements are flexible bristles that are fused together along an inboard end of the tip extension.

11. The aircraft of claim 8, wherein the flexible elements are flexible bristles that are banded together along an inboard end of the tip extension.

12. The aircraft of claim 11, wherein the flexible bristles are banded together using a sealant.

13. The aircraft of claim 8, wherein the tip extension has a shape that matches a shape of the at least one rotor blade.

14. The aircraft of claim 8, wherein the tip extension is affixed to the tip end of the rotor blade with an adhesive.

15. The aircraft of claim 8, wherein the aircraft is a vertical take-off and landing aircraft.

* * * * *